US008781027B2

(12) United States Patent
Badic et al.

(10) Patent No.: US 8,781,027 B2
(45) Date of Patent: Jul. 15, 2014

(54) APPARATUS AND METHOD FOR DETERMINING A PRECODING MATRIX

(75) Inventors: Biljana Badic, Dusseldorf (DE); Tobias Scholand, Muehlheim (DE); Rajarajan Balraj, Duesseldorf (DE); Peter Jung, Duisburg (DE); Guido Horst Bruck, Voerde (DE); Zijian Bai, Duisburg (DE); Stanislaus Iwelski, Cologne (DE)

(73) Assignee: Intel Mobile Communications GmbH, Neubiberg (DE)

(*) Notice: Subject to any disclaimer, the term of this patent is extended or adjusted under 35 U.S.C. 154(b) by 101 days.

(21) Appl. No.: 13/468,169

(22) Filed: May 10, 2012

(65) Prior Publication Data

US 2013/0301751 A1    Nov. 14, 2013

(51) Int. Cl.
*H04L 27/00* (2006.01)
(52) U.S. Cl.
USPC .......................................... 375/299
(58) Field of Classification Search
None
See application file for complete search history.

(56) References Cited

U.S. PATENT DOCUMENTS

| 8,396,438 | B2* | 3/2013 | Akkarakaran et al. ...... 455/278.1 |
| 2011/0002414 | A1* | 1/2011 | Coldrey et al. ............... 375/296 |
| 2011/0085627 | A1 | 4/2011 | Kangas et al. |
| 2012/0021688 | A1 | 1/2012 | Bhattad et al. |
| 2012/0052875 | A1 | 3/2012 | Kangas et al. |
| 2012/0113897 | A1 | 5/2012 | Thiele et al. |
| 2013/0002475 | A1* | 1/2013 | Keranen et al. ............. 342/26 R |
| 2013/0301756 | A1* | 11/2013 | Badic et al. .................. 375/340 |

OTHER PUBLICATIONS

U.S. Appl. No. 13/468,133, filed May 10, 2012 with USPTO.
3GPP. Evolved universal terrestrial radio access (e-utra); physical channels and modulation. Technical Specification 3GPP 36.211 Release-8, 3rd Generation Partnership Project, Sophia Antipolis, Dec. 2009.
3GPP. Evolved universal terrestrial radio access (e-utra); physical layer general description. Technical Specification 3GPP 36.201 Release-8, 3rd Generation Partnership Project, Sophia Antipolis, Dec. 2009.
3GPP. Evolved universal terrestrial radio access (e-utra); physical layer procedures. Technical Specification 3GPP 36.213 Release-8, 3rd Generation Partnership Project, Sophia Antipolis, Dec. 2009.
3GPP. Evolved universal terrestrial radio access (e-utra); physical channels and mod-ulation. Technical Specification 3GPP 36.211 Release-9, 3rd Generation Partnership Project, Sophia Antipolis, Mar. 2010.
3GPP. Evolved universal terrestrial radio access (e-utra); physical channels and modulation. Technical Specification 3GPP 36.211 Release-10, 3rd Generation Partnership Project, Sophia Antipolis, Dec. 2010.

(Continued)

*Primary Examiner* — Chieh M Fan
*Assistant Examiner* — Bahman Badipour
(74) *Attorney, Agent, or Firm* — Eschweiler & Associates, LLC

(57) ABSTRACT

An apparatus for determining a target precoding matrix from a plurality of precoding matrix candidates is provided. The apparatus includes a covariance matrix value provider, a real part determiner and a precoding matrix determiner. The precoding matrix determiner is adapted to determine the target precoding matrix from the plurality of precoding matrix candidates, wherein the precoding matrix determiner is configured to determine the target precoding matrix based on at least one of the one or more real covariance values.

19 Claims, 4 Drawing Sheets

(56) References Cited

OTHER PUBLICATIONS

3GPP. Evolved universal terrestrial radio access (e-utra); physical layer procedures. Technical Specification 3GPP 36.213 Release-9, 3rd Generation Partnership Project, Sophia Antipolis, Mar. 2010.

3GPP. Evolved universal terrestrial radio access (e-utra); physical layer procedures. Technical Specification 3GPP 36.213 Release-10, 3rd Generation Partnership Project, Sophia Antipolis, Dec. 2010.

J. Duplicy, B. Badic, R. Balraj, P. Horvath, F. Kaltenberger, R. Knopp, I. Kovacs, H. Nguyen, D. Tandur and G. Vivier, "MU-MIMO in LTE Systems," EURASIP Journal on Wireless Communications and Networking, vol. 2011, pp. 1-13, Nov. 2010.

Bai et al., "Receiver Performance in MU-MIMO Transmission in LTE", ICWMC'11, Luxembourg, Jun. 2011.

E. Larsson, "Robust structured interference rejection combining" in Proceedings of IEEE Wireless Communications and Networking Conference 2005, vol. 2, New Orleans, LA USA, Mar. 2005, pp. 922-926.

O. Renaudin, V.-M. Kolmonent, P. Vainikainent, and C. Oestges, "Impact of correlation matrix estimation accuracy on the computation of stationarity intervals", EuCAP'10 (Barcelona, Spain), Apr. 2010.

Final Office Action dated Feb. 24, 2014 U.S. Appl. No. 13/468,133.

Karlsson, et al. "Interference Rejection Combining for GSM." IEEE published in 1996. 5 Pages.

Cassio, et al. "Performance of Linear Multi-User MIMO Precoding in LTE System" IEEE published in 2008. 5 Pages.

Non-Final Office Action dated Nov. 4, 2013 for U.S. Appl. No. 13/468,133. 16 Pages.

\* cited by examiner

APPARATUS AND METHOD FOR DETERMINING A PRECODING MATRIX

FIELD

The present invention relates to an apparatus and method for determining a precoding matrix, and, in particular, to an apparatus and method for determining a target precoding matrix from a plurality of precoding matrix candidates, the precoding matrix candidates being adapted to be applied on a data stream, wherein the data stream is to be transmitted by a transmitter.

BACKGROUND

Long-Term Evolution (LTE) (see 3GPP. Evolved universal terrestrial radio access (e-utra); physical layer general description. Technical Specification 3GPP 36.201 Release-8, 3rd Generation Partnership Project, Sophia Antipolis, December 2009) is the trademark of the Third Generation Partnership Project (3GPP) and is aimed to become the next generation mobile network technology. In LTE, different transmission modes (TM) exist, see, for example, 3GPP. Evolved universal terrestrial radio access (e-utra); physical layer procedures. Technical Specification 3GPP 36.213 Release-8, 3rd Generation Partnership Project, Sophia Antipolis, December 2009, 3GPP. Evolved universal terrestrial radio access (e-utra); physical layer procedures. Technical Specification 3GPP 36.213 Release-9, 3rd Generation Partnership Project, Sophia Antipolis, March 2010, and 3GPP. Evolved universal terrestrial radio access (e-utra); physical layer procedures. Technical Specification 3GPP 36.213 Release-10, 3rd Generation Partnership Project, Sophia Antipolis, December 2010, which can be divided into open-loop and closed-loop transmission. In order to provide reliable communication, the user equipment (UE) has to estimate its channel. As indicated by the name 'closed-loop', the UE provides the eNodeB with information which is referred to as Channel State. Information (CSI). The CSI concerns the instantaneous state of the channel, see, for example 3GPP. Evolved universal terrestrial radio access (e-utra); physical channels and modulation. Technical Specification 3GPP 36.211 Release-8, 3rd Generation Partnership Project, Sophia Antipolis, December 2009, 3GPP. Evolved universal terrestrial radio access (e-utra); physical channels and modulation. Technical Specification 3GPP 36.211 Release-9, 3rd Generation Partnership Project, Sophia Antipolis, March 2010, and 3GPP. Evolved universal terrestrial radio access (e-utra); physical channels and modulation. Technical Specification 3GPP 36.211 Release-10, 3rd Generation Partnership Project, Sophia Antipolis, December 2010.

One parameter which may be fed back is the Precoding Matrix Index (PMI). Precoding vectors are a special kind of precoding matrices, wherein the precoding vectors are precoding matrices that only comprise a single column. The precoding matrices/precoding vectors are stored in a codebook and are known to both, eNodeB and UE, so it is sufficient to feed back only an index in order to save transmission bandwidth. In the following, reference is made to precoding vectors, while the concepts, explanations and teachings also apply to precoding matrices.

As already indicated, the precoding vector may be selected by the UE. Depending on the number of transmit antennas, several precoding vectors exist. It is a priori not known which of these precoding vectors maximizes the signal energy. According to the state of the art, at first, the signal energy is determined for all precoding vectors individually, and then, the signal energies of the precoding vectors are compared in order to feed back the most appropriate precoding vector index (or precoding matrix index, respectively). Such determination processes and comparisons are energy consuming and time consuming. It can be concluded that precious time and energy is wasted, which both are limited resources at each UE.

In the following, a complex baseband notation will be used, which deploys a matrix vector calculus for describing the system structure and the signal processing. Vectors and matrices may be denoted by lower case or upper case characters in bold face.

The matrix $1_k$ is the identity matrix of dimension k. Furthermore, $(\bullet)^*$ and $(\bullet)^H$ denote the conjugate and Hermitian operation, respectively. The magnitude of a scalar value is denoted by $|\bullet|$, where the Euclidean norm $\|\bullet\|_2$ will be used for vectors. The subscript of the Euclidean norm will be skipped in the following.

In the following, closed-loop transmission in LTE-Release 8, 9 or 10 systems using $N_T$ transmit antennas at eNodeB and $N_R$ receive antennas at UE is considered. The system model is defined by the formula:

$$r = H p d + n \quad (1)$$

and describes the transmission of symbol $d \in \mathbb{C}$ using the channel $H \in \mathbb{C}^{N_R \times N_T}$ using the precoding vector $p \in \mathbb{C}^{N_T}$. The UE receives $r \in \mathbb{C}^{N_R}$, where $n \in \mathbb{C}^{N_R}$, $n \sim CN(0, \sigma^2 I_{N_R})$ is the zero-mean circularly-symmetric complex Gaussian noise vector.

According to the state of the art, the UE reports the index i of the precoding vector from the set of available precoding vectors, which yields maximal signal energy $\|Hp_i\|^2$. In order to obtain the best PMI for M subcarriers, according to the state of the art, the following has to be calculated:

$$\arg\max_{i \in \{1,\ldots,K\}} \left\{ \sum_{j=0}^{M-1} \|H_j p_i\|^2 \right\} = \arg\max_{i \in \{1,\ldots,K\}} \left\{ \sum_{j=0}^{M-1} p_i^H H_j^H H_j p_i \right\} = \quad (2)$$

$$\arg\max_{i \in \{1,\ldots,K\}} \{p_i^H H_0^H H_0 p_i + \ldots + p_i^H H_{M-1}^H H_{M-1} p_i\} =$$

$$\arg\max_{i \in \{1,\ldots,K\}} \{p_i^H (H_0^H H_0 + \ldots + H_{M-1}^H H_{M-1}) p_i\}$$

$$= \arg\max_{i \in \{1,\ldots,K\}} \left\{ p_i^H \underbrace{\left( \sum_{j=0}^{M-1} H_j^H H_j \right)}_{:=R} p_i \right\}, \quad (3)$$

where $K = 2^{N_T}$ is the number of precoding vectors and wherein $N_T$ is the number of transmit antennas at eNodeB. According to the state of the art, an exhaustive search is to be performed by analyzing all possible precoding vectors and searching for the appropriate index. For the case of $N_T = 2$ transmit antennas and $N_T = 4$ transmit antennas, four and sixteen different precoding vectors exist, respectively.

SUMMARY

An apparatus for determining a target precoding matrix from a plurality of precoding matrix candidates is provided. The precoding matrix candidates are adapted to be applied on a data stream, wherein the data stream is to be transmitted by a transmitter. The apparatus comprises a covariance matrix value provider, a real part determiner and a precoding matrix determiner.

The covariance matrix value provider is adapted to provide one or more complex covariance matrix values, wherein the one or more complex covariance matrix values are complex numbers, wherein each one of the one or more complex covariance matrix values is an off-diagonal coefficient of a channel covariance matrix or a combination of two or more off-diagonal coefficients of the channel covariance matrix.

The real part determiner is configured to determine a real part of at least one of the one or more complex covariance matrix values or to determine a real part of a combination of at least one of the one or more complex covariance matrix values and at least one component of the precoding matrix candidates to obtain one or more real covariance values, wherein the one or more real covariance values are real numbers.

The precoding matrix determiner is adapted to determine the target precoding matrix from the plurality of precoding matrix candidates, wherein the precoding matrix determiner is configured to determine the target precoding matrix based on at least one of the one or more real covariance values.

An algorithm that delivers the same result as the state of the art but which reduces the number of operation steps significantly is provided. In contrast to the state of the art, not all possible precoding vectors have to be analyzed. In modern Field Programmable Gate Arrays (FPGAs) or Digital Signal Processors (DSPs), the calculation of all combinations is feasible in real time, but each operation step uses energy, which is a limited resource in mobile devices. If the UE is operating in closed-loop, the index of the precoding vector may be calculated frequently, so applying an algorithm, which has a complexity of less than one third or one fourth compared to the state of the art solution results in considerable savings regarding the power consumption at the UE. Moreover, the computation time needed is reduced significantly.

Depending on number of transmit antennas, LTE specification for precoding based spatially multiplexing transmissions includes a total of 4 precoding vectors and 16 precoding vectors for two and four transmit antenna configurations, respectively. Proper selection of the optimal precoding vector requires knowledge of the current channel conditions at the transmitter. In an LTE precoded downlink closed-loop transmission, the mobile terminal or user equipment (UE) will measure the channel characteristics and determine the precoding matrix index (PMI), channel quality indicator (CQI) and/or Rank Index (RI). In this context, the name precoding matrix is a general denotation. In the following, the explanations refer to a precoding vector or to one of the columns of the precoding matrix, e.g. the first column of the precoding matrix, what also results in considering a precoding vector. However, other embodiments, wherein the precoding matrix has more than one column, take all columns of the precoding matrix into account, e.g. the other columns of the precoding matrix are processed in the same way as e.g. explained for the (column of the) precoding vector.

This most appropriate PMI will be sent to the base station (eNodeB) which would assist the eNodeB in selecting the precoding vector to improve overall system performance. As channel conditions may change rapidly over time, it is important for the system to avoid excessive delays in such a closed-loop system. Reduction of the signaling overhead and associated feedback delay is accomplished by restricting the number of codebook selections. However, reducing the number of selections may also limit the number of possible adjustments thus reducing the effectiveness of precoding. On the other hand, it is a priori not known which of these precoding vectors optimizes the performance, so all precoding vectors have to be evaluated individually first and all results have to be compared to each other in order to feed back the most appropriate PMI. This state-of-the-art procedure results in that precious energy is wasted, which results to a limited resource at each UE.

According to embodiments, a new developed algorithm is provided which delivers the same result as the state of art approach, but reduces the number of operation steps (computation efforts) significantly. Instead of performing an exhaustive search over all precoding vectors, this algorithm exploits mathematical properties of the precoding vectors (first element of precoding vector is always constant and other elements vary but they are limited to finite set of different values), the structure of the MIMO channel covariance matrix (Hermitian) and alignment between the channel matrix and precoding vectors.

In an embodiment, in case of two transmit antennas the provided algorithm of an embodiment restricts on analysis of only one coefficient and determines the index of precoding vector maximizing the squared Euclidean. Moreover, in an embodiment, in case of four transmit antennas there may be four coefficients to be analyzed. The provided algorithms reduce the set of precoding vectors to be analyzed compared to the state of the art. Thus, the complexity can be reduced more than four times compared to the state-of-the-art approach for two transmit antennas and by three times for four transmit antennas. If the UE is operating in closed-loop, the PMI has to be calculated frequently, so applying the invented algorithm, which has a complexity of less than one third or even one fourth compared to the state of the art solution results in considerably savings regarding power consumption at the UE.

According to an embodiment, a mobile communication device is provided. The mobile communication device comprises a baseband processor, an antenna and an apparatus for determining a target precoding matrix from a plurality of precoding matrix candidates. The precoding matrix candidates are adapted to be applied on a data stream, wherein the data stream is to be transmitted by a transmitter. The apparatus for determining the target precoding matrix comprises a covariance matrix value provider, a real part determiner and a precoding matrix determiner.

The covariance matrix value provider is adapted to provide one or more complex covariance matrix values, wherein the one or more complex covariance matrix values are complex numbers, wherein each one of the one or more complex covariance matrix values is an off-diagonal coefficient of a channel covariance matrix or a combination of two or more off-diagonal coefficients of the channel covariance matrix.

The real part determiner is configured to determine a real part of at least one of the one or more complex covariance matrix values or to determine a real part of a combination of at least one of the one or more complex covariance matrix values and at least one component of the precoding matrix candidates to obtain one or more real covariance values, wherein the one or more real covariance values are real numbers.

The precoding matrix determiner is adapted to determine the target precoding matrix from the plurality of precoding matrix candidates, wherein the precoding matrix determiner is configured to determine the target precoding matrix based on at least one of the one or more real covariance values.

In another embodiment, a method for determining a target precoding matrix from a plurality of precoding matrix candidates is provided. The precoding matrix candidates are adapted to be applied on a data stream, wherein the data stream is to be transmitted by a transmitter. The method comprises providing one or more complex covariance matrix values, wherein the one or more complex covariance matrix values are complex numbers, wherein each one of the one or more complex covariance matrix values is an off-diagonal coefficient of a channel covariance matrix or a combination of two or more off-diagonal coefficients of the channel covariance matrix. The method further comprises determining a real part of at least one of the one or more complex covariance matrix values or determining a real part of a combination of at least one of the one or more complex covariance matrix values and at least one component of the precoding matrix candidates to obtain one or more real covariance values, wherein the one or more real covariance values are real numbers. Lastly, the method comprises determining the target precoding matrix from the plurality of precoding matrix candidates, wherein the precoding matrix determiner is configured to determine the target precoding matrix based on at least one of the one or more real covariance values.

DETAILED DESCRIPTION

Figure 1:
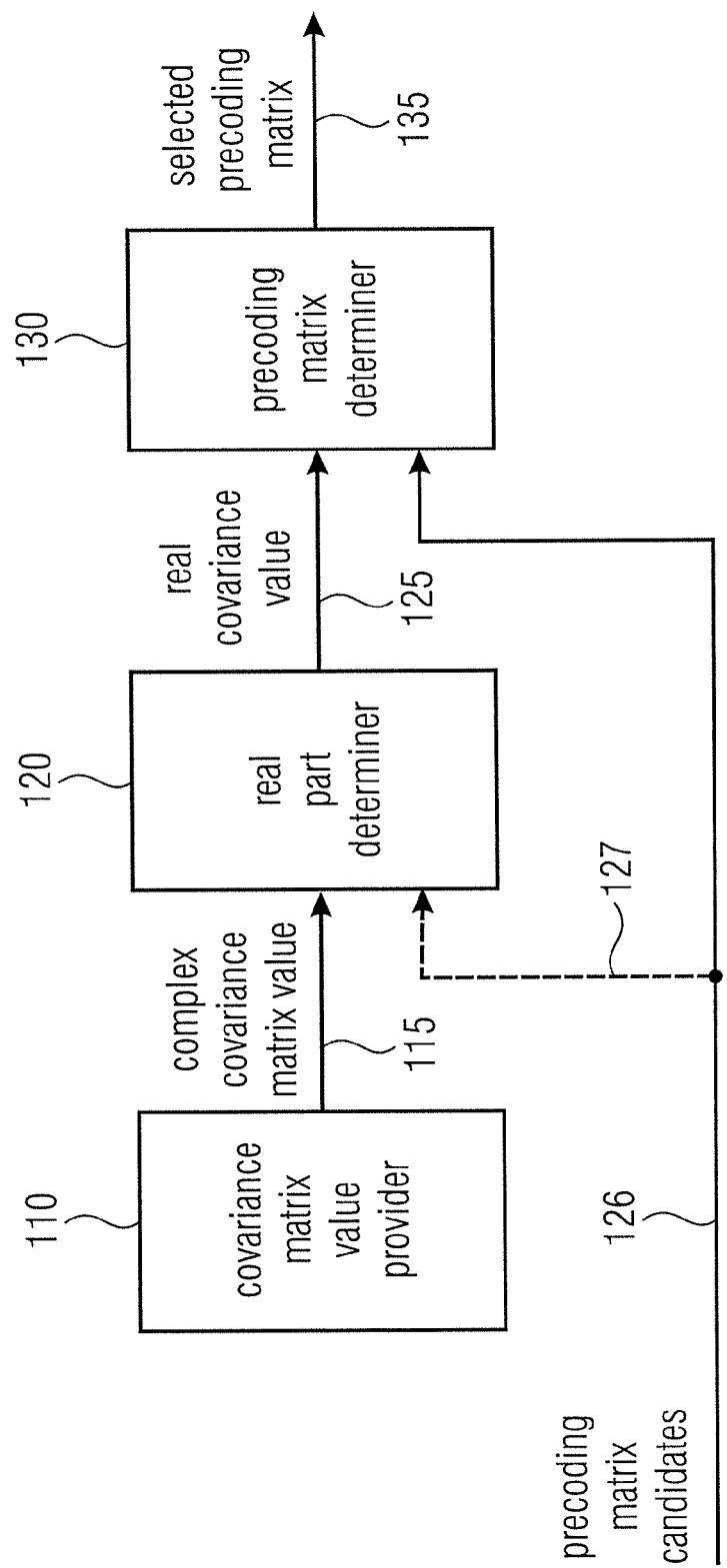
FIG. 1 illustrates an apparatus for determining a target precoding matrix according to an embodiment.

FIG. 1 illustrates an apparatus for determining a target precoding matrix from a plurality of precoding matrix candidates. The precoding matrix candidates are adapted to be applied on a data stream. Moreover, the data stream is to be transmitted by a transmitter. The apparatus comprises a covariance matrix value provider 110, a real part determiner 120 and a precoding matrix determiner 130.

The covariance matrix value provider 110 is adapted to provide one or more complex covariance matrix values, wherein the one or more complex covariance matrix values are complex numbers. Each one of the one or more complex covariance matrix values is an off-diagonal coefficient of a channel covariance matrix or a combination of two or more off-diagonal coefficients of the channel covariance matrix. For example, the channel covariance matrix may be a Multiple Input Multiple Output channel covariance matrix, being derived from a channel matrix H which represents a relation between the antennas of the transmitter and the antennas of a receiver. The channel covariance matrix may then be the matrix product of a Hermitian complex matrix of the channel matrix H and the channel matrix H itself. The covariance matrix value provider 110 may be adapted to provide the complex covariance matrix value to the real part determiner 120. This is indicated by arrow 115.

FIG. 1 moreover depicts the real part determiner 120. In an embodiment, the real part determiner 120 is configured to determine a real part of a combination of at least one of the complex covariance matrix values and at least one component of the precoding matrix candidates. For this, in such an embodiment, the precoding matrix candidates are available for the real part determiner 120, what is indicated by a dashed arrow 127. In both embodiments, the real part determiner 120 is configured to obtain one or more covariance values, wherein the one or more real covariance values are real numbers. Moreover, the real part determiner 120 is adapted to provide the one or more real covariance values to the precoding matrix determiner 130. This is indicated by arrow 125.

Furthermore, FIG. 1 illustrates the precoding matrix determiner 130. The precoding matrix determiner 130 is configured to determine the target precoding matrix from the plurality of precoding matrix candidates by comparing at least one of the real covariance values and at least one other value. For example, the at least one other value may be predetermined. According to another embodiment, one of the real covariance values is compared with all or at least some of the other real covariance values, for example, to determine a maximum of the real covariance values. In an embodiment, that precoding matrix candidate is selected as the target precoding matrix which has a real covariance value assigned to it that is a maximum covariance value. The precoding matrix determiner 130 may then be adapted to provide the target precoding matrix, as indicated by arrow 135.

A precoding matrix candidate may have a plurality of columns and a plurality of rows, wherein each coefficient may relate to one of the transmit antennas and possibly to a particular subband. Precoding vectors however, which are special kinds of precoding matrices, only have a single column. Their components relate to the transmit antennas of a transmitter.

Figure 2:
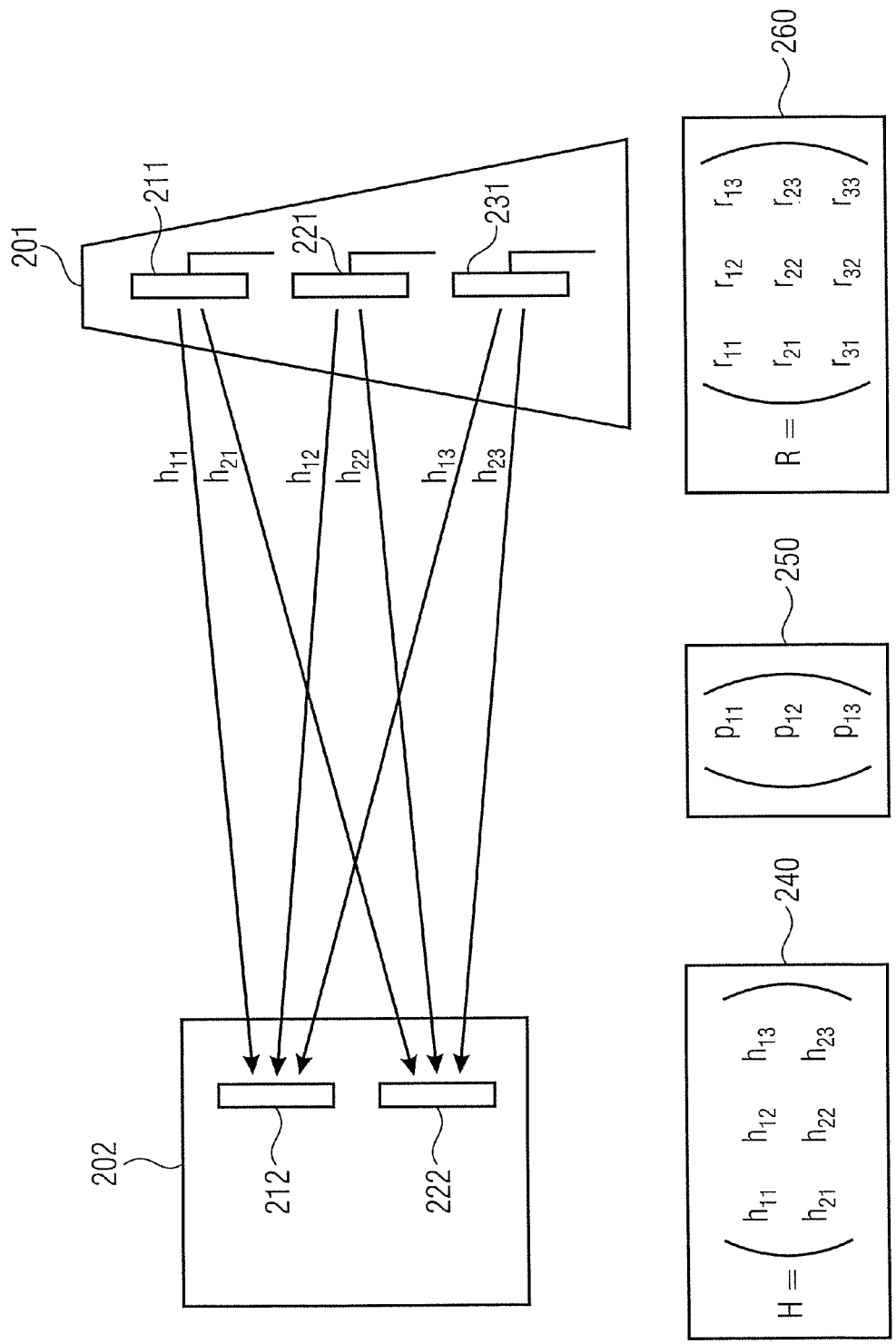
FIG. 2 illustrates a setup of a communication system depicting a transmitter having three transmit antennas, a receiver having two receive antennas, a respective channel matrix, a respective precoding vector and a respective complex covariance matrix.

FIG. 2 illustrates the channel matrix and the complex covariance matrix in more detail. Moreover, a transmitter 201 and a receiver 202 are depicted. The transmitter 201 comprises a first transmit antenna 211, a second transmit antenna 221 and a third transmit antenna 231. The receiver 202, for example, a mobile phone, e.g., a smartphone, comprises a first receive antenna 212 and a second receive antenna 222. The channel from the first transmit antenna 211 to the first receive antenna 212 is indicated by arrow $h_{11}$. The channel from the first transmit antenna 211 to the second receive antenna 222 is indicated by $h_{21}$. The other channels are indicated by $h_{12}$, $h_{22}$, $h_{13}$ and $h_{23}$. A channel matrix H which indicates the channels from the transmit antennas to the receive antennas is shown in box 240. The channel matrix has three columns, as there are three transmit antennas. Moreover, the channel matrix has two rows as there are two receive antennas. Thus, the matrix has six complex coefficients indicating the channels from the transmit antennas to the receive antennas.

Furthermore, FIG. 2 depicts a precoding vector in box 250. As there are three transmit antennas, the precoding vector comprises three components $p_{11}$, $p_{12}$ and $p_{13}$.

Moreover, box 260 illustrates a complex covariance matrix R. In the example of FIG. 2, the complex covariance matrix R may be defined by the formula $R = H^H H$. Such a complex covariance matrix R is referred to as a Multiple Input Multiple Output channel covariance matrix, as it is formed based on a channel matrix H which characterizes the channels from a transmitter having multiple transmit antennas to a receiver having multiple receive antennas.

Embodiments are based on the concept of reducing the complexity by making use of mathematical properties of the precoding vectors.

In the following, different embodiments are presented. A first group of embodiments relates to transmission on two antenna ports. Later, another group of embodiments is presented relating to the transmission on four antenna ports.

At first, transmission on two antenna ports is presented in more detail. The precoding vectors for transmission on two antenna ports may be described as:

$$p_1 = \frac{1}{\sqrt{2}}\begin{pmatrix}1\\1\end{pmatrix} \qquad (4)$$

$$p_2 = \frac{1}{\sqrt{2}}\begin{pmatrix}1\\-1\end{pmatrix}$$

$$p_3 = \frac{1}{\sqrt{2}}\begin{pmatrix}1\\j\end{pmatrix}$$

$$p_4 = \frac{1}{\sqrt{2}}\begin{pmatrix}1\\-j\end{pmatrix}$$

or, in a more general form:

$$p_i = \frac{1}{\sqrt{2}}\begin{pmatrix}1\\v_i\end{pmatrix},$$

wherein $$v_i = (1, -1, j, -j)$$

with only one degree of freedom. $v_i$ is a component of the precoding vector. The matrix R in formula (3) can be written as $$R = \sum_{j=0}^{M-1} H_j^H H_j \qquad (5)$$

$$= \sum_{j=0}^{M-1}\begin{pmatrix}h_{11} & h_{12}\\h_{21} & h_{22}\end{pmatrix}_j^H \begin{pmatrix}h_{11} & h_{12}\\h_{21} & h_{22}\end{pmatrix}_j$$

$$= \sum_{j=0}^{M-1}\begin{pmatrix}h_{11}^* & h_{21}^*\\h_{12}^* & h_{22}^*\end{pmatrix}_j \begin{pmatrix}h_{11} & h_{12}\\h_{21} & h_{22}\end{pmatrix}_j$$

$$= \sum_{j=0}^{M-1}\begin{pmatrix}|h_{11}|^2+|h_{21}|^2 & h_{11}^* h_{12} + h_{21}^* h_{22}\\h_{11} h_{12}^* + h_{21} h_{22}^* & |h_{12}|^2 + |h_{22}|^2\end{pmatrix}_j$$

$$= \begin{pmatrix}r_{11} & r_{12}\\r_{21} & r_{22}\end{pmatrix}$$

$$= \begin{pmatrix}r_{11} & r_{12}\\r_{12}^* & r_{22}\end{pmatrix},$$

by using the symmetry of Hermitian matrix operation, where $H_j$ denotes the channel matrix for subcarrier j. The precoding vector p and $p^H$ is denoted by $$p = \begin{pmatrix}p_1\\p_2\end{pmatrix} \text{ and } p^H = (p_1^* \; p_2^*) \qquad (6)$$

respectively. Calculating the matrix vector product $p^H R p$ and applying the symmetry of matrix R, yields $$\arg\max_{i\in\{1,\ldots,4\}} p_i^H R p_i = \arg\max_{i\in\{1,\ldots,4\}} \frac{1}{2}(r_{11} + r_{12} v_i + v_i^*(r_{12}^* + r_{22} v_i)) \qquad (7)$$

$$= \arg\max_{i\in\{1,\ldots,4\}} \frac{1}{2}\left(r_{11} + r_{12} v_i + r_{12}^* v_i^* + r_{22}\underbrace{|v_i|}_{=1}\right)$$

$$= \arg\max_{i\in\{1,\ldots,4\}} \frac{1}{2}(r_{12} v_i + r_{12}^* v_i^*)$$

$$= \arg\max_{i\in\{1,\ldots,4\}} \Re\{r_{12} v_i\}.$$

As can be seen in formula (7), it is sufficient to only analyze one coefficient $r_{12}$ of R. The algorithm to determine the precoding vector is given in Table 1. The same concept can also be employed for the case of four transmit antenna ports at eNodeB.

TABLE 1

| algorithm for $v_i$ |
|---|
| function [$v_i$] = estimate_PMI ($r_{12}$) |
|   if ( \| $\Re\{r_{12}\}$ \| > \| $\Im\{r_{12}\}$ \| )                   (1) |
|     if ( $\Re\{r_{12}\}$ > 0) then $v_i \leftarrow 1$            (2) |
|     else $v_i \leftarrow -1$                                      (3) |
|     endif                                                   (4) |
|   else                                                      (5) |
|     if ($\Im\{r_{12}\}$ > 0) then $v_i \leftarrow -j$           (6) |
|     else $v_i \leftarrow j$                                          (7) |
|     endif                                                   (8) |
|   endif                                                  (9) |
|   return $v_i$ |
| end |

In some of the above-described embodiments, the target precoding matrix is a target precoding vector and is selected from the precoding vector candidates presented in formula (4):

$$p_1 = \frac{1}{\sqrt{2}}\begin{pmatrix}1\\1\end{pmatrix} \qquad (4)$$

$$p_2 = \frac{1}{\sqrt{2}}\begin{pmatrix}1\\-1\end{pmatrix}$$

$$p_3 = \frac{1}{\sqrt{2}}\begin{pmatrix}1\\j\end{pmatrix}$$

$$p_4 = \frac{1}{\sqrt{2}}\begin{pmatrix}1\\-j\end{pmatrix}$$

The symbol $d \in \mathbb{C}$ in formula (1):

$$r = H p d + n \qquad (1)$$

that may also apply for the above-described embodiments is a symbol of a data stream to be transmitted.

Moreover, in the above-described embodiments, the matrix R as defined in formula (5) may be a Multi Input Multi Output channel covariance matrix having two rows and two columns. The off-diagonal element $r_{12}$ in the formula (5) and in formula (7) or in Table 1 may be provided as one of the complex covariance matrix values and may be a complex number.

In an embodiment, a real part determiner may be configured to determine a real part of the off-diagonal element $r_{12}$ as one of the one or more real covariance values. In such an embodiment, the precoding matrix determiner may be configured to determine the target precoding vector based on the real part of the off-diagonal element $r_{12}$ as one of the one or more real covariance values. According to an embodiment, this determination is conducted according to the algorithm provided in Table 1.

In Table 1, a first absolute value of the real covariance value and a second absolute value of an imaginary number of one of the complex covariance matrix value $r_{12}$ are compared;

$$|\Re\{r_{12}\}| > |\Im\{r_{12}\}|$$

(see line 1 of the algorithm of table 1).

According to another embodiment, a real part determiner may be configured to determine a real part of a combination of the complex covariance matrix value $r_{12}$ and the component $v_i$ of each of the precoding matrix candidates to obtain four real covariance values $\Re\{r_{12} v_i\}$. In such an embodiment, the precoding matrix determiner may be configured to determine the target precoding matrix based on the four real covariance values by applying the last line of formula (7):

$$: \arg\max_{i\in\{1,\ldots,4\}} \Re\{r_{12} v_i\}$$

In one embodiment, no main-diagonal coefficient of the Multi Input Multi Output channel covariance matrix R of formula (5) is determined, e.g. the coefficients of the matrix R which have a column index that is the same as the row index are not determined, e.g. the coefficients $r_{11}$ and $r_{22}$ of the matrix R in formula (5) are not determined.

In an embodiment, each one of the one or more off-diagonal coefficients of the Multi Input Multi Output channel covariance matrix is a coefficient of a product of a group of one or more matrix products, e.g. if $R=H^H H$
And if H is defined as:

$$\begin{pmatrix} h_{11} & h_{12} \\ h_{21} & h_{22} \end{pmatrix}$$

then $H^H$ which is the conjugate transpose matrix of matrix H is defined by:

$$\begin{pmatrix} h_{11}^* & h_{21}^* \\ h_{12}^* & h_{22}^* \end{pmatrix}$$

and the matrix product R of both matrices is:

$$\begin{pmatrix} h_{11}^* & h_{21}^* \\ h_{12}^* & h_{22}^* \end{pmatrix} \begin{pmatrix} h_{11} & h_{12} \\ h_{21} & h_{22} \end{pmatrix}$$

In another embodiment, each one of the one or more off-diagonal coefficients of the Multi Input Multi Output channel covariance matrix is a sum of coefficients of products of the group of matrix products.

E.g., see line 3 of formula (5):

$$\sum_{j=0}^{M-1} \begin{pmatrix} h_{11}^* & h_{21}^* \\ h_{12}^* & h_{22}^* \end{pmatrix}_j \begin{pmatrix} h_{11} & h_{12} \\ h_{21} & h_{22} \end{pmatrix}_j$$

There, the group of channel matrices comprises the channel matrices:

$$\begin{pmatrix} h_{11} & h_{12} \\ h_{21} & h_{22} \end{pmatrix}_j$$

of each subcarrier j. Moreover, the group of matrix products comprises the matrix products $$\begin{pmatrix} h_{11}^* & h_{21}^* \\ h_{12}^* & h_{22}^* \end{pmatrix}_j \begin{pmatrix} h_{11} & h_{12} \\ h_{21} & h_{22} \end{pmatrix}_j$$

of each subcarrier j. Furthermore, the off-diagonal coefficients of the Multi Input Multi Output channel covariance matrix R of formula (5) are therefore a sum of coefficients of products of the group of matrix products.

In the following, an example is presented. Assume for simplicity M=1, so $R=H^H H$. A possible realization of H and R may be $$H = \begin{pmatrix} -1.5972 - 0.3066j & 0.2254 + 2.5303j \\ 0.6096 + 0.2423j & -0.9247 + 1.9583j \end{pmatrix}$$

and hence $$R = \begin{pmatrix} 3.0756 & -1.2251 - 2.5545j \\ -1.2251 + 2.5545j & 11.1432 \end{pmatrix}.$$

The classic approach aims to analyze all possible precoding vectors $p_i$, $i\in\{1, \ldots, 4\}$, and reports the index i with maximal squared Euclidean norm $\|H p_i\|^2$, done as follows:

$$\frac{1}{2}\left\|H\begin{pmatrix}1\\1\end{pmatrix}\right\|^2 = \frac{1}{2}\left\|\begin{pmatrix}-1.3718+2.2237j\\-0.3150+2.2006j\end{pmatrix}\right\|^2$$
$$= 5.8843 \ (i=1)$$

$$\frac{1}{2}\left\|H\begin{pmatrix}1\\-1\end{pmatrix}\right\|^2 = \frac{1}{2}\left\|\begin{pmatrix}-1.8226-2.8369j\\-1.5343-1.7160j\end{pmatrix}\right\|^2$$
$$= 8.3345 \ (i=2)$$

$$\frac{1}{2}\left\|H\begin{pmatrix}1\\j\end{pmatrix}\right\|^2 = \frac{1}{2}\left\|\begin{pmatrix}-4.1276-0.0812j\\-1.3486-0.6824j\end{pmatrix}\right\|^2$$
$$= 9.6639 \ (i=3)$$

$$\frac{1}{2}\left\|H\begin{pmatrix}1\\-j\end{pmatrix}\right\|^2 = \frac{1}{2}\left\|\begin{pmatrix}0.6598-0.3762j\\1.8158+0.8252j\end{pmatrix}\right\|^2$$
$$= 4.5548 \ (i=4)$$

$$\to \max\{5.8843, 8.3345, 9.6639, 4.5548\} = 9.6639 \ (i=3)$$

The precoding vector which maximizes the energy given the matrix H is $p_3$. The same result is obtained by using the algorithm described in Table 1, which restricts on coefficient $r_{12}=-1.2251-2.5545j$ of matrix R. Obviously $|\Re\{r_{12}\}|=1.2251$ and $|\Im\{r_{12}\}|=2.5545$. Hence line (1) of Table 1 is not fulfilled and the algorithm proceeds with line (5) of Table 1. By the reason of $\Im\{r_{12}\}=-2.5545<0$, set $v=j$ according to line (7) and return v.

Figure 3:
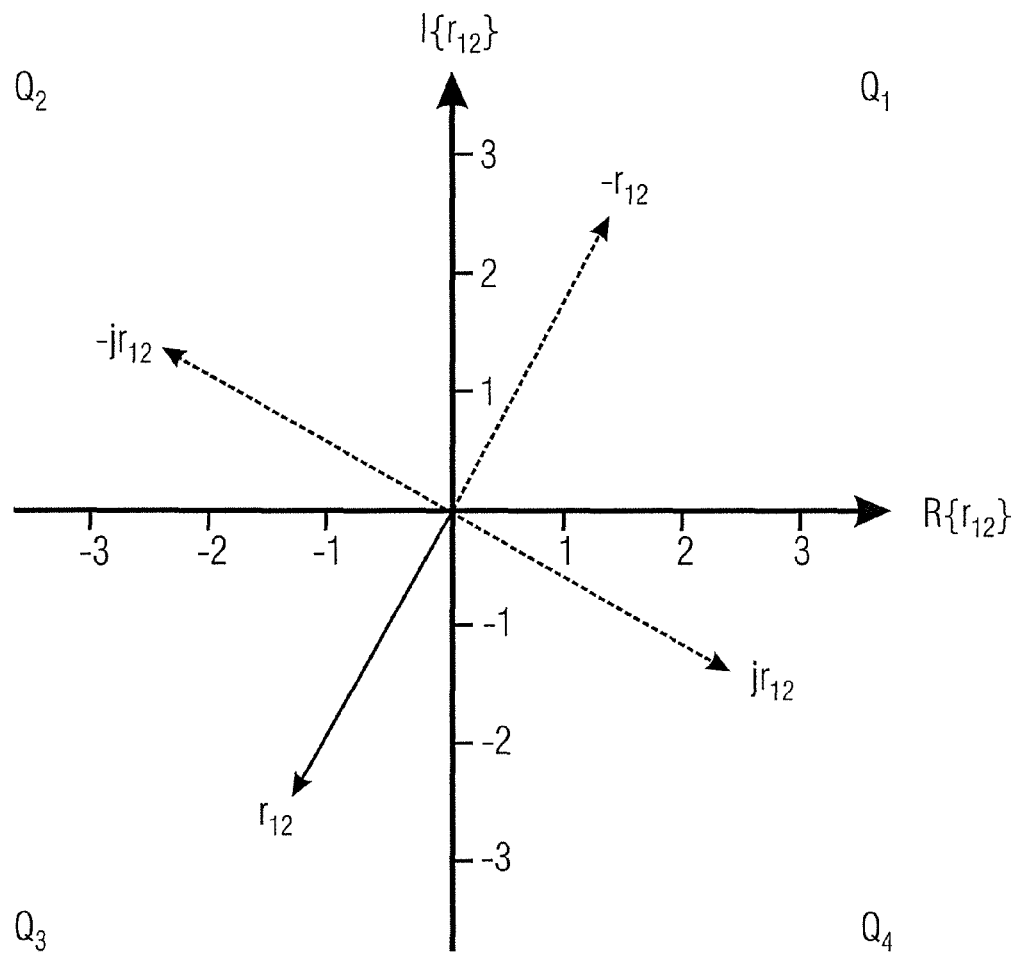
FIG. 3 illustrates the effect of applying a precoding vector on a component of a data stream.

FIG. 3 illustrates a geometric representation of formula (7). Geometrically, the product of $r_{12}$ and v, $v\in\{1, j, -1, -j\}$ is equivalent to turn $r_{12}$ through 0°, 90°, 180° and 270°, respectively. Regarding $r_{12}=-1.2251-2.5545j$, the coefficient lies in quadrant $Q_3$. Due to formula (7) and $|\Im\{r_{12}\}|>|\Re\{r_{12}\}|$, the best solution is to turn $r_{12}$ through 90° what is equivalent to multiply $r_{12}$ with j. Hence, $r_{12}$ is transformed into quadrant $Q_4$.

Figure 4:
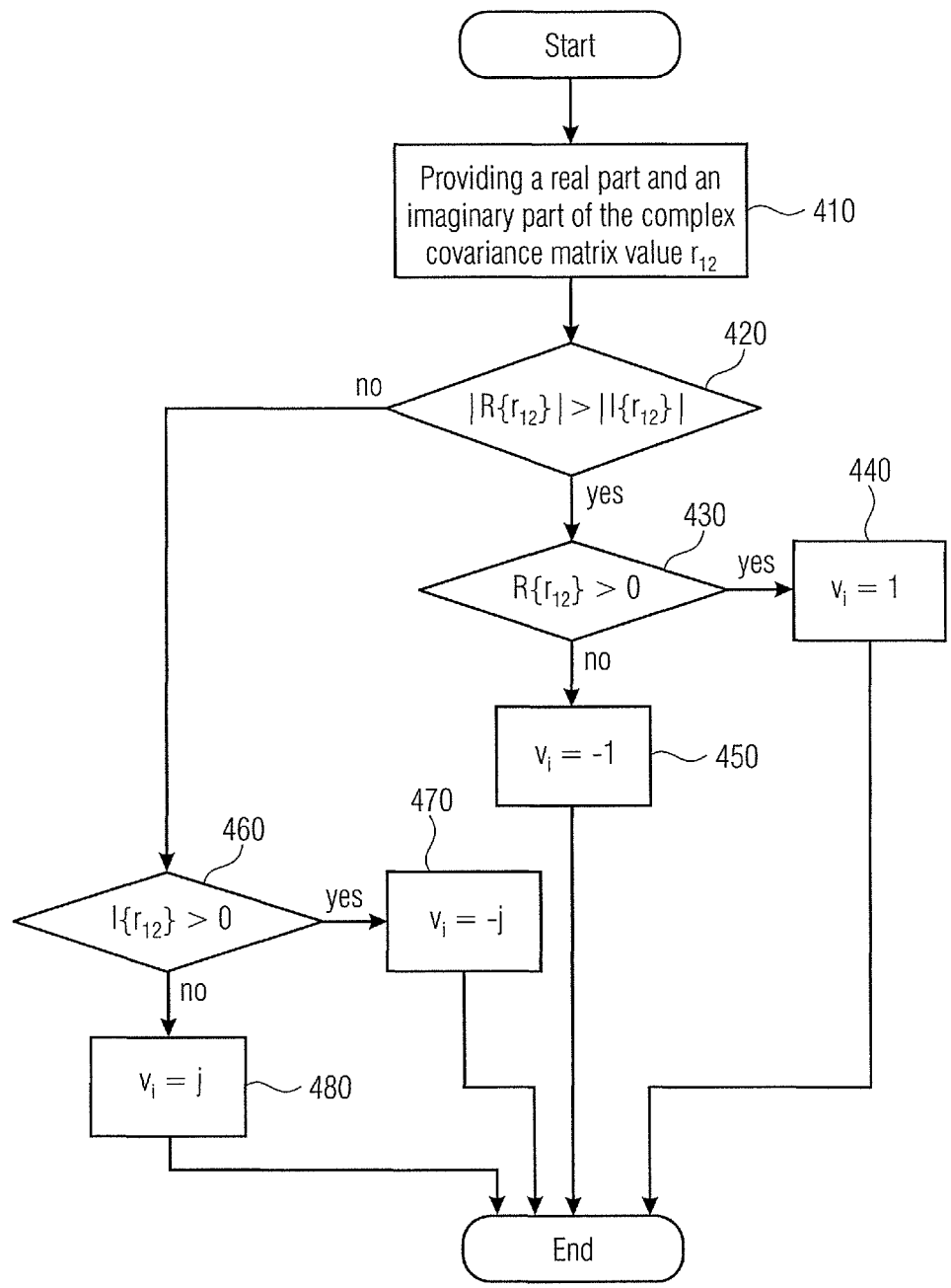
FIG. 4 illustrates a flow chart depicting steps of a method for determining a target precoding vector.

FIG. 4 illustrates a flow chart depicting steps of a method for determining a target precoding vector. The method is similar to the algorithm presented in table 1. In step 410, a real part and an imaginary part of the complex covariance matrix value $r_{12}$ is provided. Then, in step 420, it is determined, whether $|\Re\{r_{12}\}|$ is greater than $|\Im\{r_{12}\}|$. If this is the case, then, in step 430, it is determined, whether $|\Re\{r_{12}\}|$ is greater than 0. If this is also the case, then $v_i$ is set to 1 (step 440), otherwise $v_i$ is set to −1 (step 450). If, however, it is determined in step 420 that $|\Re\{r_{12}\}|$ is not greater than $|\Im\{r_{12}\}|$, then it is checked in step 460, whether $|\Im\{r_{12}\}|$ is greater than 0. If this is the case, then $v_i$ is set to −j (step 470), otherwise $v_i$ is set to j (step 480).

In the following, complexity is considered. The $\mathcal{O}(n)$ notation is used to express the complexity for an operation. With reference to modern Digital Signal Processors (DSPs), the following operations and their complexities are identified. Regarding the classic approach, we first calculate the matrix vector product.

$$Hp_i = \begin{pmatrix} h_{11} & h_{12} \\ h_{21} & h_{22} \end{pmatrix} \begin{pmatrix} p_1 \\ p_2 \end{pmatrix}$$
$$= \begin{pmatrix} h_{11}p_1 + h_{12}p_2 \\ h_{21}p_1 + h_{22}p_2 \end{pmatrix}$$
$$= \begin{pmatrix} g_1 \\ g_2 \end{pmatrix}$$
$$= g$$

$$\Rightarrow O(Hp_i) = 4 \cdot MUL + 2 \cdot ADD = 4 \cdot O(1) + 2 \cdot O(1) = 6 \cdot O(1)$$

and $$\|g\|^2 = g^H g = (g_1^*, g_2^*)\begin{pmatrix} g_1 \\ g_2 \end{pmatrix}$$

$$\Rightarrow O(\|g\|^2) = 2 \cdot CONJ + TRANSP + 2 \cdot MUL + ADD = 6 \cdot O(1),$$

resulting in $12 \cdot \mathcal{O}(1)$ operations for a single precoding vector. Due to four different precoding vectors $p_i$, $i \in \{1, \ldots, 4\}$, the operations have to be repeated four times, yielding $4 \cdot 12 \cdot \mathcal{O}(1) = 48 \cdot \mathcal{O}(1)$ operations. Finally the index corresponding to the precoding vector maximizing the energy has to be searched and reported. Assuming the worst case for the search procedure $\mathcal{O}(n)$ can be rated to $3 \cdot \mathcal{O}(1)$ comparisons. Hence, the classic approach needs $51 \cdot \mathcal{O}(1)$ operations in total.

Regarding the complexity reduced approach of the above embodiment, first precompute:

$$r_{12} = h_{11} * h_{12} + h_{12} * h_{22}$$

$$\mathcal{O} \Rightarrow (r_{12}) = 2 \cdot CONJ + 2 \cdot MUL + ADD = 5 \cdot \mathcal{O}(1).$$

The complexity of algorithm in Table 1 is summarized in Table 3, taking into account the complexities for each operation given in Table 2.

TABLE 1 algorithm for $v_i$

```
function [v_i] = estimate_PMI (r_12)
    if (| ℜ {r_12} | > |ℑ {r_12} |)              (1)
        if (ℜ {r_12} > 0) then v_i ← 1           (2)
        else v_i ← −1                             (3)
        endif                                     (4)
    else                                          (5)
        if (ℑ {r_12} > 0) then v_i ← −j          (6)
        else v_i ← j                              (7)
        endif                                     (8)
    endif                                         (9)
    return v_i
end
```

TABLE 2 complexity of used operations

| addition | ADD | $\mathcal{O}(1)$ |
| --- | --- | --- |
| multiplication | MUL | $\mathcal{O}(1)$ |
| conjugate | CONJ | $\mathcal{O}(1)$ |
| transpose | TRANSP | $\mathcal{O}(1)$ |
| comparison | COMP | $\mathcal{O}(1)$ |
| $\Re\{\cdot\}$ | REAL | $\mathcal{O}(1)$ |
| $\Im\{\cdot\}$ | IMAG | $\mathcal{O}(1)$ |
| $|\cdot|$ | MAGN | $\mathcal{O}(1)$ |
| switch | SWITCH | $\mathcal{O}(1)$ |
| case | CASE | $\mathcal{O}(1)$ |
| search | SEARCH | $\mathcal{O}(n)$ |

The complexity reduced algorithm of the above embodiments has a total complexity $12 \cdot \mathcal{O}(1)$, which is more than four times lower than the state of the art.

TABLE 3 complexities for algorithm in Table 1

| line | operation(s) | complexity |
| --- | --- | --- |
| 1 | $\Re\{\cdot\}, \Im\{\cdot\}, 2 \cdot$ MAGN, COMP | $5 \cdot \mathcal{O}(1)$ |
| 2 | $\Re\{\cdot\}$, COMP | $2 \cdot \mathcal{O}(1)$ |
| 3 | — | — |
| 4 | — | — |
| 5 | see above | see above |
| 6 | — | — |
| 7 | — | — |
| 8 | — | — |
| 9 | — | — |
| Σ | | $7 \cdot \mathcal{O}(1)$ |

In the following, embodiments are presented relating to the transmission on four antenna ports.

Calculating the precoding vectors for transmission on four antenna ports on one layer at eNodeB, the following precoding vectors can be obtained for s=1, using $$W_n^{\{s\}} = I_4 - 2 \cdot u_n u_n^H / u_n^H u_n$$

$$W_n^{\{s\}} = (p_n, p_n', p_n'', p_n''')$$

$$p_1 = \begin{pmatrix} 0.5 \\ 0.5 \\ 0.5 \\ 0.5 \end{pmatrix}$$

$$p_2 = \begin{pmatrix} 0.5 \\ 0.5j \\ -0.5 \\ -0.5j \end{pmatrix}$$

$$p_3 = \begin{pmatrix} 0.5 \\ -0.5 \\ 0.5 \\ -0.5 \end{pmatrix}$$

$$p_4 = \begin{pmatrix} 0.5 \\ -0.5j \\ -0.5 \\ 0.5j \end{pmatrix}$$

$$p_5 = \begin{pmatrix} 0.5 \\ \frac{1}{2\sqrt{2}} + \frac{1}{2\sqrt{2}}j \\ 0.5j \\ -\frac{1}{2\sqrt{2}} + \frac{1}{2\sqrt{2}}j \end{pmatrix}$$

$$p_6 = \begin{pmatrix} 0.5 \\ -\frac{1}{2\sqrt{2}} + \frac{1}{2\sqrt{2}}j \\ -0.5j \\ \frac{1}{2\sqrt{2}} + \frac{1}{2\sqrt{2}}j \end{pmatrix}$$

$$p_7 = \begin{pmatrix} 0.5 \\ -\frac{1}{2\sqrt{2}} - \frac{1}{2\sqrt{2}}j \\ 0.5j \\ \frac{1}{2\sqrt{2}} - \frac{1}{2\sqrt{2}}j \end{pmatrix}$$

$$p_8 = \begin{pmatrix} 0.5 \\ \frac{1}{2\sqrt{2}} - \frac{1}{2\sqrt{2}}j \\ -0.5 \\ -\frac{1}{2\sqrt{2}} - \frac{1}{2\sqrt{2}}j \end{pmatrix}$$

$$p_9 = \begin{pmatrix} 0.5 \\ 0.5 \\ -0.5 \\ -0.5 \end{pmatrix}$$

$$p_{10} = \begin{pmatrix} 0.5 \\ 0.5j \\ 0.5 \\ 0.5j \end{pmatrix}$$

$$p_{11} = \begin{pmatrix} 0.5 \\ -0.5 \\ -0.5 \\ 0.5 \end{pmatrix}$$

$$p_{12} = \begin{pmatrix} 0.5 \\ -0.5j \\ 0.5 \\ -0.5j \end{pmatrix}$$

$$p_{13} = \begin{pmatrix} 0.5 \\ 0.5 \\ 0.5 \\ -0.5 \end{pmatrix}$$

$$p_{14} = \begin{pmatrix} 0.5 \\ 0.5 \\ -0.5 \\ 0.5 \end{pmatrix}$$

$$p_{15} = \begin{pmatrix} 0.5 \\ -0.5 \\ 0.5 \\ 0.5 \end{pmatrix}$$

$$p_{16} = \begin{pmatrix} 0.5 \\ -0.5 \\ -0.5 \\ -0.5 \end{pmatrix}$$

where s=1 is the column vector $p_n$ of matrix $W_n$.

The best PMI $p_i$, $i \in \{1, \ldots, 16\}$ maximizes the received signal energy $\|H p_i\|^2$. Depending on the number of receive antennas $N_R$ at UE, different channel matrices $H_{N_R}$ can be obtained:

$$H_{N_R=1} = (h_{11} \ h_{12} \ h_{13} \ h_{14}) \quad \in \mathbb{C}^{1 \times 4}$$

$$H_{N_R=2} = \begin{pmatrix} h_{11} & h_{12} & h_{13} & h_{14} \\ h_{21} & h_{22} & h_{23} & h_{24} \end{pmatrix} \in \mathbb{C}^{2 \times 4}$$

$$H_{N_R=4} = \begin{pmatrix} h_{11} & h_{12} & h_{13} & h_{14} \\ h_{21} & h_{22} & h_{23} & h_{24} \\ h_{31} & h_{32} & h_{33} & h_{34} \\ h_{41} & h_{42} & h_{43} & h_{44} \end{pmatrix} \in \mathbb{C}^{4 \times 4}$$

for one, two or four receive antennas at the UE. The matrix R in formula (3) can be written as $$R = \sum_{j=0}^{M-1} H_j^H H_j,$$

where
$H_j^H \in \mathbb{C}^{4 \times N_R}$ and $H_j \in \mathbb{C}^{N_R \times 4}$,
so
$R \in \mathbb{C}^{4 \times 4}$
independent from the number of receive antennas $N_R$ at UE.

Thus, we set $$R = \sum_{j=0}^{M-1} H_j^H H_j$$

$$= \sum_{j=0}^{M-1} \begin{pmatrix} h_{11} & \cdots & h_{14} \\ \vdots & \ddots & \vdots \\ h_{N_R 1} & \cdots & h_{N_R 4} \end{pmatrix}_j^H \begin{pmatrix} h_{11} & \cdots & h_{14} \\ \vdots & \ddots & \vdots \\ h_{N_R 1} & \cdots & h_{N_R 4} \end{pmatrix}_j$$

$$= \sum_{j=0}^{M-1} \begin{pmatrix} h_{11}^* & \cdots & h_{N_R 1}^* \\ \vdots & \ddots & \vdots \\ h_{14}^* & \cdots & h_{N_R 4}^* \end{pmatrix}_j \begin{pmatrix} h_{11} & \cdots & h_{14} \\ \vdots & \ddots & \vdots \\ h_{N_R 1} & \cdots & h_{N_R 4} \end{pmatrix}_j$$

$$= \begin{pmatrix} r_{11} & r_{12} & r_{13} & r_{14} \\ r_{21} & r_{22} & r_{23} & r_{24} \\ r_{31} & r_{32} & r_{33} & r_{34} \\ r_{41} & r_{42} & r_{43} & r_{44} \end{pmatrix}$$

-continued $$= \begin{pmatrix} r_{11} & r_{12} & r_{13} & r_{14} \\ r_{12}^* & r_{22} & r_{23} & r_{24} \\ r_{13}^* & r_{23}^* & r_{33} & r_{34} \\ r_{14}^* & r_{24}^* & r_{34}^* & r_{44} \end{pmatrix},$$

by using the symmetry of Hermitian matrix operation. The precoding vector p and $p^H$ is denoted by $$p = \begin{pmatrix} p_1 \\ p_2 \\ p_3 \\ p_4 \end{pmatrix} \text{ and } p^H = (p_1^* \ p_2^* \ p_3^* \ p_4^*) \quad (8)$$

respectively. Calculating the matrix vector product $p^H R p$ and applying the symmetry of matrix R, yields $$\underbrace{\sum_{i=1}^{4} r_{ii}|p_i|^2}_{=const} + \quad (9)$$

$$2\Re\{r_{12}p_1^* p_2 + r_{13}p_1^* p_3 + r_{14}p_1^* p_4 + r_{23}p_2^* p_3 + r_{24}p_2^* p_4 + r_{34}p_3^* p_4\}.$$

The sum on the left hand side is real valued and does no play a role for maximizing the equation, as will be shown in the following. For each element $p_m$, $m \in \{1, \ldots, 4\}$, the magnitude $|p_m|$ is constant and does not depend on m. Further all diagonal elements $r_{ii}$ of matrix R are real valued, so the sum will be neglected due to no contribution for maximization. Regarding the first entry of $p_i$, we recognize that $p_1 = p_1^* = 0.5$ is constant and real valued for all $i \in \{1, \ldots, 16\}$. The maximization problem can be simplified to $$\arg\max_{i \in \{1,\ldots,16\}} \left\{ \sum_{j=0}^{M-1} \|H_j p_i\|^2 \right\} = \quad (10)$$

$$2\Re\left\{ \frac{1}{2}r_{12}p_2 + \frac{1}{2}r_{13}p_3 + \frac{1}{2}r_{14}p_4 + r_{23}p_2^* p_3 + r_{24}p_2^* p_4 + r_{34}p_3^* p_4 \right\}.$$

Next, all four possible values from the codebook for $p_3 \in \{\pm 0.5, \pm 0.5j\}$ are inserted into formula (10) and four equations are obtained, which have to be maximized separately.

(A) $p_3 = 0.5 \Leftrightarrow : \ 2\Re\left\{\frac{1}{2}r_{12}p_2 + \frac{1}{4}r_{13} + \frac{1}{2}r_{14}p_4 + \frac{1}{2}r_{23}^* p_2 + r_{24}^* p_2 p_4^* + \frac{1}{2}r_{34}p_4\right\}$ $\Re\{(r_{12} + r_{23}^*)p_2 + (r_{14} + r_{34})p_4 + 2r_{24}p_2^* p_4\} \to \max$ (B) $p_3 = -0.5 \Leftrightarrow : \ 2\Re\left\{\frac{1}{2}r_{12}p_2 - \frac{1}{4}r_{13} + \frac{1}{2}r_{14}p_4 - \frac{1}{2}r_{23}^* p_2 + r_{24}^* p_2 p_4^* - \frac{1}{2}r_{34}p_4\right\}$ $\Re\{(r_{12} - r_{23}^*)p_2 + (r_{14} - r_{34})p_4 + 2r_{24}p_2^* p_4\} \to \max$ (C) $p_3 = 0.5j \Leftrightarrow : \ 2\Re\left\{\frac{1}{2}r_{12}p_2 + \frac{1}{4}r_{13}j + \frac{1}{2}r_{14}p_4 - \frac{1}{2}r_{23}^* p_2 j + r_{24}^* p_2 p_4^* - \frac{1}{2}r_{34}p_4 j\right\}$ $\Re\{(r_{12} - r_{23}^* j)p_2 + (r_{14} - r_{34}j)p_4 + 2r_{24}p_2^* p_4\} \to \max$ (D) $p_3 = -0.5j \Leftrightarrow : \ 2\Re\left\{\frac{1}{2}r_{12}p_2 - \frac{1}{4}r_{13}j + \frac{1}{2}r_{14}p_4 + \frac{1}{2}r_{23}^* p_2 j + r_{24}^* p_2 p_4^* + \frac{1}{2}r_{34}p_4 j\right\}$ $\Re\{(r_{12} + r_{23}^* j)p_2 + (r_{14} + r_{34}j)p_4 + 2r_{24}p_2^* p_4\} \to \max$ For case (A) there are six precoding vectors which fulfill $p_3 = 0.5$, namely $p_{S_A}$, $S_A \in \{3, 10, 12, 13, 15\}$, summarized in Table 4. All other precoding vectors are listed in the corresponding tables.

TABLE 4 set of precoding vectors for $p_3 = 0.5$

| $p_3 = 0.5$ | $p_2$ | $p_4$ | $2p_2^* p_4$ |
|---|---|---|---|
| $A_1$ | 0.5 | 0.5 | 0.5 |
| $A_2$ | −0.5 | −0.5 | 0.5 |
| $A_3$ | 0.5j | 0.5j | 0.5 |
| $A_4$ | −0.5j | −0.5j | 0.5 |
| $A_5$ | 0.5 | −0.5 | −0.5 |
| $A_6$ | −0.5 | 0.5 | −0.5 |

TABLE 5 set of precoding vectors for $p_3 = 0.5i$

| $p_3 = 0.5i$ | $p_2$ | $p_4$ | $2p_2^* p_4$ |
|---|---|---|---|
| $C_1$ | $\frac{1}{2\sqrt{2}} + \frac{1}{2\sqrt{2}}j$ | $-\frac{1}{2\sqrt{2}} - \frac{1}{2\sqrt{2}}j$ | $\frac{1}{2}j$ |
| $C_2$ | $-\frac{1}{2\sqrt{2}} - \frac{1}{2\sqrt{2}}j$ | $\frac{1}{2\sqrt{2}} - \frac{1}{2\sqrt{2}}j$ | $\frac{1}{2}j$ |

TABLE 6 set of precoding vectors for $p_3 = -0.5$

| $p_3 = -0.5$ | $p_2$ | $p_4$ | $2p_2^* p_4$ |
|---|---|---|---|
| $B_1$ | 0.5j | −0.5j | −0.5 |
| $B_2$ | −0.5j | 0.5j | −0.5 |
| $B_3$ | 0.5 | −0.5 | −0.5 |
| $B_4$ | −0.5 | 0.5 | −0.5 |
| $B_5$ | 0.5 | 0.5 | 0.5 |
| $B_6$ | −0.5 | −0.5 | 0.5 |

TABLE 7 set of precoding vectors for $p_3 = -0.5j$

| $p_3 = -0.5j$ | $p_2$ | $p_4$ | $2p_2^* p_4$ |
|---|---|---|---|
| $D_1$ | $-\frac{1}{2\sqrt{2}} + \frac{1}{2\sqrt{2}}j$ | $\frac{1}{2\sqrt{2}} - \frac{1}{2\sqrt{2}}j$ | $-\frac{1}{2}$ |
| $D_2$ | $\frac{1}{2\sqrt{2}} + \frac{1}{2\sqrt{2}}j$ | $-\frac{1}{2\sqrt{2}} - \frac{1}{2\sqrt{2}}j$ | $-\frac{1}{2}$ |

Regarding Table 4, it can be recognized that the first four cases $(A_1, \ldots, A_4)$ hold the same value for the sum $2p_2^* p_4$ on the right hand side. Further $p_2 = p_4$ holds. The former property allows to disregard the sum $2p_2^* p_4$ for maximization purpose, while the latter one reduces the two dimensional optimization problem to a one dimensional optimization problem, leading to a simplified solution:

$$\Re\{(r_{12}+r_{23}^*)p_2 + (r_{14}+r_{34})p_4 + 2r_{24}p_2^* p_4\} \to \max$$

$$\Rightarrow \Re\{(r_{12}+r_{23}^*)p_2 + (r_{14}+r_{34})p_2\} \to \max$$

$$\Rightarrow \Re\{(r_{12}+r_{14}+r_{23}^*+r_{34})p_2\} \to \max$$

$$\Rightarrow \Re\{(r_{12}+r_{14}+r_{23}^*+r_{34})v_i\} \to \max, \quad (11)$$

where $v_i \in \{\pm 1 \pm j\}$. The solution corresponds to the solution presented above. Due to the same approach, we just have to define $\tilde{r}_{12} := r_{12}+r_{14}+r_{23}^*+r_{34}$, run function estimate $-PMI$ ($\tilde{r}_{12}$) in Table 1 and obtain $v_i$ with the mapping $v_i = 1 \to A_1$ $v_i = -1 \to A_2$ $v_i = j \to A_3$ $v_i = -j \to A_4$, as defined in Table 4. Applying $v_i$ into the equation of optimization problem (A) for the cases $\langle A_1, \ldots, A_4 \rangle$, formula (12) is obtained:

$$\max\{\langle A_1, \ldots, A_4 \rangle\} = \Re\left\{(r_{12}+r_{23}^*)v_i + (r_{14}+r_{34})v_i + 2\frac{1}{4}r_{24}\underbrace{|v_i|^2}_{=1}\right\} \quad (12)$$

$$= \Re\left\{(r_{12}+r_{14}+r_{23}^*+r_{34})v_i + \frac{1}{2}r_{24}\right\}$$

The sum on the right hand side for the two remaining cases $\langle A_5, A_6 \rangle$ is also constant and the assumption $p_4 = -p_2$ holds, so formula (13) is obtained:

$$\Re\{(r_{12}+r_{23}^*)p_2 + (r_{14}+r_{34})p_4 + 2r_{24}p_2^* p_4\} \to \max$$

$$\Rightarrow \Re\{(r_{12}+r_{23}^*)p_2 - (r_{14}+r_{34})p_2\} \to \max$$

$$\Rightarrow \Re\{(r_{12}-r_{14}+r_{23}^*-r_{34})p'_2\} \to \max$$

$$\Rightarrow \Re\{(r_{12}-r_{14}+r_{23}^*-r_{34})\omega_i\} \to \max, \quad (13)$$

where $\omega_i \in \{\pm 1\}$ and, moreover, the mapping $\omega_i = 1 \to A_5$ $\omega_i = -1 \to A_6$.

is obtained. Applying $\omega_i$ into the equation of optimization problem (A) for the cases $\langle A_5, A_6 \rangle$, formula (14) is obtained:

$$\max\{\langle A_5, A_6 \rangle\} = \Re\left\{(r_{12}+r_{23}^*)\omega_i - (r_{14}+r_{34})\omega_i - 2\frac{1}{4}r_{24}\underbrace{|\omega_i|^2}_{=1}\right\} \quad (14)$$

$$= \Re\left\{(r_{12}-r_{14}+r_{23}^*+r_{34})\omega_i - \frac{1}{2}r_{24}\right\}.$$

If the maximum value of the first set $\max\{\langle A_1, \ldots, A_4\rangle\}$ is greater than the maximum value of the second set $\max\{\langle A_5, A_6\rangle\}$, we have to look for the best index in the first set, otherwise in the second one. Using $$A_i = \arg\max\{\arg\max\{\langle A_1, \ldots, A_5\rangle\}, \arg\max\{\langle A_5, A_6\rangle\}\}, \quad (15)$$

we set the value of the possible candidate from (A) is set to $$\Omega_A = \quad (16)$$
$$\Re\left\{(r_{12}+r_{23}^*)p_2\big|_{A_i} + (r_{14}+r_{34})p_4\big|_{A_i} + 2r_{24}p_2\big|_{A_i}p_4\big|_{A_i} + \frac{1}{2}r_{13}\right\},$$

where the index i is the corresponding line number in Table 4 for $p_2$ and $p_4$.
The procedure for optimization problem (B) is analog and the detailed description will be omitted. Instead, the algorithm is shown in Table 8.

Regarding Table 5, no symmetry can be used apart from the case that the sum $2p_2^* p_4$ can be neglected. Hence $$\Re\{(r_{12}-r_{23}^* j)(1+j) + (r_{14}-r_{34}j)(-1+j)\} \overset{C_1}{\underset{C_2}{\gtrless}}$$

$$\Re\{(r_{12}-r_{23}^* j)(-1-j) + (r_{14}-r_{34}j)(1+j)\}$$

is obtained and is simplified to $$\Re\{(r_{12}-r_{14}+r_{23}^*+r_{34}) + j(r_{12}+r_{14}-r_{23}^*+r_{34})\} \overset{C_1}{\underset{C_2}{\gtrless}} 0$$

$$\Re\{r_{12}-r_{14}+r_{23}^*+r_{34}\} + \mathcal{F}\{r_{12}+r_{14}-r_{23}^*+r_{34}\} \overset{C_1}{\underset{C_2}{\gtrless}} 0,$$

using $$\Re\{z_1+jz_2\} = \Re\{z_1\} - \Im\{z_2\}, z_1, z_2 \in \mathbb{C}$$

and C is set to $C_1$ or $C_2$. The value of the possible candidate from C calculates to $$\Omega_A = \quad (17)$$
$$\Re\left\{(r_{12}-r_{23}^* j)p_2\big|_C + (r_{14}-r_{34}j)p_4\big|_C + 2r_{24}p_2\big|_C p_4\big|_C + \frac{1}{2}r_{13}j\right\}.$$

The procedure for optimization problem (D) is analog and the detailed description will be omitted. Instead, the algorithm is shown in Table 11

Executing all four algorithm for $p_3 \in \{\pm 0.5, \pm 0.5j\}$ results in a set real values $\Omega_\psi = (\Omega_A, \Omega_B, \Omega_C, \Omega_D)$. Finally we have to choose $$\tilde{p}_\psi = \arg\max_{\psi \in \{A,B,C,D\}} \{\Omega_\psi\} \quad (18)$$

and obtain $p_3$ directly from $\psi$. In the last step we have to look up $p_2$ and $p_4$ in the corresponding table.

According to those above-described embodiments which describe transmission on four antenna ports, a target precoding vector is determined as target precoding matrix from the plurality of 16 precoding vector candidates $p_1$ to $p_{16}$ depicted above.

Each one of the one or more complex covariance matrix values may be a combination of two or more off-diagonal coefficients of the channel covariance matrix, for example, the combination of the last line of formula (11):

$$(r_{12} + r_{14} + r_{23}^* + r_{34})$$

A real part determiner may be configured to determine a real part of a combination of at least one of the complex covariance matrix values and at least one component of the precoding matrix candidates to obtain one or more real covariance values. In the last line of formula (11), the above complex covariance matrix value is combined with a component of each precoding vector candidate, and a real covariance value for each precoding vector candidate is determined, see, again, the last line of formula (11):

$$\Re\{(r_{12} + r_{14} + r_{23}^* + r_{34})v_i\}$$

Moreover, a precoding matrix determiner may be configured to determine the target precoding vector based on the one or more real covariance values.

In the following, an example for determining a target precoding vector in the four antenna ports case is presented.

Assume for simplicity $M=1$, so $R = H^H H$. A possible realization of $H$ and $R$ may be $$H = \begin{pmatrix} -0.9545 + 0.5140j & 0.5054 + 0.6282j & 0.9963 - 2.0819j & 0.5072 + 0.9689j \\ 2.1460 - 0.2146j & -0.1449 - 0.8111j & 1.0021 + 1.0171j & 1.1528 - 1.2102j \\ 0.5129 + 0.2078j & -0.0878 - 0.7558j & 0.4748 + 0.2299j & 0.3457 - 0.0723j \\ -0.0446 - 0.5567j & 1.0534 - 0.5724j & -0.8538 - 0.5338j & 0.7316 - 0.1707j \end{pmatrix} \text{ and}$$

$$R = \begin{pmatrix} 6.4449 & -0.2269 - 2.3886j & 0.5378 + 3.4406j & 2.9721 - 3.2294j \\ -0.2269 + 2.3886j & 3.3451 & -2.5838 - 1.7250j & 2.5723 + 1.7881j \\ 0.5378 - 3.4406j & -2.5838 + 1.7250j & 8.6581 & -1.9737 + 0.0586j \\ 2.9721 + 3.2294j & 2.5723 - 1.7881j & -1.9737 - 0.0586j & 4.6787 \end{pmatrix}$$

respectively. The classic approach is to analyze all possible precoding vectors $p_i$, $i \in \{1, \ldots, 16\}$, and report the index $i$ with maximal squared Euclidean norm $\|Hp_i\|^2$. The squared Euclidean norm for precoding vector $p_1$ given the channel matrix $H$ has been calculated as $$\left\| H \underbrace{\begin{pmatrix} 0.5 \\ 0.5 \\ 0.5 \\ 0.5 \end{pmatrix}}_{p_1} \right\|^2 = \left\| \begin{pmatrix} 0.5272 + 0.0146j \\ 2.0780 - 0.6094j \\ 0.6228 - 0.1952j \\ 0.4433 - 0.9168j \end{pmatrix} \right\|^2 = 6.4306$$

and is summarized upon the other squared Euclidean norms for precoding vectors $p_i$, $i \in \{1, \ldots, 16\}$ in Table 15. The precoding vector which maximizes the energy given the matrix $H$ is $p_6$. The same result using the algorithm described in Tables 8-11 is obtained, which restricts on the set of coefficients $\{r_{12}, r_{13}, r_{14}, r_{23}, r_{24}, r_{34}\}$ of matrix $R$. The algorithms in Table 8 and Table 9 are very similar, so only the first one will be discussed in detail. As $$r'_A = r_{12} + r_{23}^* + r_{14} + r_{34} = -1.8123 - 3.8344j \quad \text{(line 1)},$$

So it can be seen that $$|\Re\{r'_A\}| < |\Im\{r'_A\}|$$

and $$\Im\{r'_A\} < 0,$$

so $v_i = j$ and $A'$ is set to $A' = A_3$. For the next if clause (line 10 of Table 8), set $$r''_A = r_{12} - r_{14} + r_{23}^* - r_{34} = -3.8091 + 2.5072j \quad \text{(line 2)}$$

and obtain $\Re\{r''_A\} = -3.8091 < 0$ (line 11 of Table 8), so $A'' = A_6$. As already mentioned, the first four and last two cases in Table 4 have different signs, so they have to be evaluated separately $$\Re\{(r_{12} + r_{23}^*)p_2|_{A'} + (r_{14} + r_{34}^*)p_4|_{A'} + 2r_{24}p_2^*|_{A'} p_4|_{A'}\} = 3.2033$$

$$> \Re\{(r_{12} + r_{23}^*)p_2|_{A''} + (r_{14} + r_{34}^*)p_4|_{A''} + 2r_{24}p_2^*|_{A''} p_4|_{A''}\} = 0.6184$$

so $A = A' = A_3$ and $$\Omega_A = \Re\{(r_{12} + r_{23}^*)p_2|_A + (r_{14} + r_{34})p_4|_A + 2r_{24}p_2^*|_A p_4|_A + 0.5r_{13}\} = 3.4722 \text{ (line 16)} \quad (19)$$

with $$p_2|_A = 0.5j$$

$$p_4|_A = 0.5j.$$

Due to similarity of algorithm in Table 8 and Table 9, only the result $\Omega_B = 4.6686$ is given. The algorithm in Table 10 and Table 11 are very similar, so only the first one will be discussed in detail. As $$r'_C = r_{12} - r_{14} + r_{23}^* + r_{34} = -7.7566 + 2.6244j \quad \text{(line 1)}$$

$$\Re\{r'_C\} = -7.7566 \text{ and}$$

$$r''_C = r_{12} + r_{14} + r_{23}^* + r_{34} = 3.3553 - 7.2845j \quad \text{(line 2)}$$

$$\Im\{r''_C\} = -7.2845 \text{ so}$$

$$\Re\{r'_C\} - \Im\{r''_C\} = -7.7566 + 7.2845 = -0.4721 < 0 \quad \text{(line 4)}.$$

Hence we conclude $C = C_2$. For $$\Omega_C = \Re\{(r_{12} - r_{23}^*j)p_2|_C + (r_{14} - r_{34}j)p_4|_C + 2r_{24} p_2^*|_C p_4|_C + 0.5r_{13}j\} = -2.4474 \quad (20)$$

(line 5) holds with $$p_2|_C = -\frac{1}{2\sqrt{2}} - \frac{1}{2\sqrt{2}}j$$

$$p_4|_C = \frac{1}{2\sqrt{2}} - \frac{1}{2\sqrt{2}}j$$

Due to similarity of the algorithm in Table 10 and Table 11, only the result $\Omega_D = 7.9322$ is given. The set $\Psi_\psi = (\Omega_A, \Omega_B, \Omega_C, \Omega_D) = (3.4722, 4.6686, -2.4474, 7.9322)$ has the maximal values for $p_3 = \{\pm 0.5, \pm 0, 5j\}$. The maximal value is at fourth position and $D = D_1$ holds, so we obtain the precoding vector from Table 7 with $$p_1 = 0.5$$

$$p_2 = -\frac{1}{2\sqrt{2}} + \frac{1}{2\sqrt{2}}j$$

$$p_3 = -0.5j$$

$$p_4 = \frac{1}{2\sqrt{2}} + \frac{1}{2\sqrt{2}}j$$

and hence, the index of precoding vector $p_6$ is reported.

TABLE 8 algorithm for $p_3 = 0.5$

| | |
|---|---|
| $r_A' \leftarrow r_{12} + r_{14} + r_{23}^* + r_{34}$ | (1) |
| $r_A'' \leftarrow r_{12} - r_{14} + r_{23}^* - r_{34}$ | (2) |
| $v_i = \text{estimate\_PMI}(r_A')$ | (3) |
| switch $(v_i)$ | (4) |
|     case 1: $A' \leftarrow A_1$ | (5) |
|     case $-1$: $A' \leftarrow A_2$ | (6) |
|     case j: $A' \leftarrow A_3$ | (7) |
|     case $-$j: $A' \leftarrow A_4$ | (8) |
| end | (9) |
| if $(\Re\{r_A''\} > 0)$ then $A'' \leftarrow A_5$ | (10) |
| else $A'' \leftarrow A_6$ | (11) |
| endif | (12) |
|     $\Re\{(r_{12} + r_{23}^*) p_{2\|A''} +$ | |
|     $(r_{14} + r_{34}) p_{4\|A''} +$ | |
|     $2 r_{24} p_{2\|A''}^* p_{4\|A''}\}$ | (13) |
|     $A \leftarrow A'$ | (14) |
| else $A \leftarrow A''$ | (15) |
| $\Omega_A = \Re\{(r_{12} + r_{23}^*) p_{2\|A} +$ | |
|     $(r_{14} + r_{34}) p_{4\|A} +$ | |
|     $2 r_{24} p_{2\|A}^* p_{4\|A} +$ | |
|     $0.5 r_{13}\}$ | (16) |

TABLE 9 algorithm for $p_3 = -0.5$

| |
|---|
| $r_B' \leftarrow r_{12} - r_{14} - r_{23}^* + r_{34}$ |
| $r_B'' \leftarrow r_{12} + r_{14} - r_{23}^* - r_{34}$ |
| $v_i = \text{estimate\_PMI}(r_B')$ |
| switch $(v_i)$ |
|   case 1: $B' \leftarrow B_3$ |
|   case $-1$: $B' \leftarrow B_4$ |
|   case j: $B' \leftarrow B_1$ |
|   case $-$j: $B' \leftarrow B_2$ |
| end |
|   if $\{\Re\{r_B''\} > 0\}$ then $B'' \leftarrow B_5$ |
|   else $B'' \leftarrow B_6$ |
| endif |
|   $\Re\{(r_{12} - r_{23}^*) p_{2\|B''} +$ |
|   $(r_{14} - r_{34}) p_{4\|B''} +$ |
|   $2 r_{24} p_{2\|B''}^* p_{24\|B''}\}$ |

TABLE 9-continued algorithm for $p_3 = -0.5$

| |
|---|
|     $B \leftarrow B'$ |
| else $B \leftarrow B''$ |
| $\Omega_B = \Re\{(r_{12} - r_{23}^*) p_{2\|B} +$ |
|   $(r_{14} - r_{34}) p_{4\|B} +$ |
|   $2 r_{24} p_{2\|B}^* p_{4\|B} -$ |
|   $0.5 r_{13}\}$ |

TABLE 10 algorithm for $p_3 = 0.5$ j

| | |
|---|---|
| $r_C' \leftarrow r_{12} - r_{14} + r_{23}^* + r_{34}$ | (1) |
| $r_C'' \leftarrow r_{12} + r_{14} - r_{23}^* + r_{34}$ | (2) |
| if $(\Re[r_C'] - \Im\{r_C''\}) > 0$ | (3) |
| then $C \leftarrow C_1$ | |
| else $C \leftarrow C_2$ | (4) |
| endif | |
| $\Omega_C = \Re\{(r_{12} - r_{23}^* j) p_{2\|C} +$ | |
|   $(r_{14} - r_{34} j) p_{4\|C} +$ | |
|   $2 r_{24} p_{2\|C}^* p_{4\|C} +$ | |
|   $0.5 r_{13} j\}$ | (5) |

TABLE 11 algorithm for $p_3 = -0.5$ j

| |
|---|
| $r_D' \leftarrow -r_{12} + r_{14} - r_{23}^* - r_{34}$ |
| $r_D'' \leftarrow r_{12} + r_{14} - r_{23}^* + r_{34}$ |
| if $(\Re\{r_D'\} - \Im\{r_D''\}) > 0$ |
| then $D \leftarrow D_1$ |
| else $D \leftarrow D_2$ |
| endif |
| $\Omega_D = \Re\{(r_{12} + r_{23}^* j) p_{2\|D} +$ |
|   $(r_{14} + r_{34} j) p_{4\|D} +$ |
|   $2 r_{24} p_{2\|D}^* p_{4\|D} -$ |
|   $0.5 r_{13} j\}$ |

In the following, a complexity analysis is provided. In the same way as presented above, the complexity of the classic and improved approach will be analyzed, assuming $N_R = 4$. The complexities of the operations can be found in Table 2.

First the matrix vector product is calculated:

$$Hp_i = \begin{pmatrix} h_{11} & h_{12} & h_{13} & h_{14} \\ h_{21} & h_{22} & h_{23} & h_{24} \\ h_{31} & h_{32} & h_{33} & h_{34} \\ h_{41} & h_{42} & h_{43} & h_{44} \end{pmatrix} \begin{pmatrix} p_1 \\ p_2 \\ p_3 \\ p_4 \end{pmatrix}$$

$$= \begin{pmatrix} h_{11}p_1 + h_{12}p_2 + h_{13}p_3 + h_{14}p_4 \\ h_{21}p_1 + h_{22}p_2 + h_{23}p_3 + h_{24}p_4 \\ h_{31}p_1 + h_{32}p_2 + h_{33}p_3 + h_{34}p_4 \\ h_{41}p_1 + h_{42}p_2 + h_{43}p_3 + h_{44}p_4 \end{pmatrix}$$

$$= \begin{pmatrix} g_1 \\ g_2 \\ g_3 \\ g_4 \end{pmatrix}$$

$$= g$$

$$\Rightarrow O(Hp_i) = 4(4 \cdot MUL + 3 \cdot ADD) = 28 \cdot O(1)$$

and

-continued $$\|g\|^2 = g^H g = (g_1^*, g_2^*, g_3^*, g_4^*)\begin{pmatrix} g_1 \\ g_2 \\ g_3 \\ g_4 \end{pmatrix}$$

$$\Rightarrow \mathcal{O}(\|g\|^2) = 4 \cdot MUL + 3 \cdot ADD + 4 \cdot CONJ = 11 \cdot \mathcal{O}(1)$$

resulting in 39 $\mathcal{O}(1)$ operations for a single precoding vector. Due to 16 different precoding vectors $p_i$, $i \in \{1, \ldots, 16\}$, the operations have to be repeated 16 times, yielding $16 \cdot 39 \cdot \mathcal{O}(1) = 624 \cdot \mathcal{O}(1)$ operations. Finally the index corresponding to the precoding vector maximizing the energy has to be searched and reported. Assuming the worst case for the search procedure $\mathcal{O}(n)$ can be rated $15 \cdot \mathcal{O}(1)$ comparisons. In total the classic approach needs $639 \cdot \mathcal{O}(1)$ operations.

Regarding the complexity reduced approach, at first, precompute $$r_{12} = h_{11}^* h_{12} + h_{21}^* h_{22} + h_{31}^* h_{32} + h_{41}^* h_{42}$$

$$r_{13} = h_{11}^* h_{13} + h_{21}^* h_{23} + h_{31}^* h_{33} + h_{41}^* h_{43}$$

$$r_{14} = h_{11}^* h_{14} + h_{21}^* h_{24} + h_{31}^* h_{34} + h_{41}^* h_{44}$$

$$r_{23} = h_{12}^* h_{13} + h_{22}^* h_{23} + h_{32}^* h_{33} + h_{42}^* h_{43}$$

$$r_{24} = h_{12}^* h_{14} + h_{22}^* h_{24} + h_{32}^* h_{34} + h_{42}^* h_{44}$$

$$r_{34} = h_{13}^* h_{14} + h_{23}^* h_{24} + h_{33}^* h_{34} + h_{43}^* h_{44}$$

$$\Rightarrow \mathcal{O}(r_{ij}) = 4 \cdot MUL + 3 \cdot ADD + 4 \cdot CONJ = 11 \cdot \mathcal{O}(1)$$

what results in $6 \cdot 11 \cdot \mathcal{O}(1) = 66 \cdot \mathcal{O}(1)$ operations. The complexities of the algorithms in Tables 8/9 and Tables 10/11 are shown in Table 12 and 13 respectively. The algorithms in Tables 8 and 9 are identical regarding complexity. Furthermore the algorithms in Tables 10 and 11 are identical as well, regarding complexity. The values obtained in line 16 and line 5 in the algorithm in Table 8, 9 and 10, 11 respectively will be evaluated later in (18). In the worst case, 3 comparisons have to be made, resulting in $3 \cdot \mathcal{O}(1)$ to determine the maximal index of four values. Summing up the single complexities of all subroutines yields $217 \cdot \mathcal{O}(1)$ computations and is much better than the classic approach.

TABLE 12 complexities for algorithms in Tables 8 and 9

| line | operation(s) | complexity |
|---|---|---|
| (1) | 3 · ADD, CONJ | $4 \cdot \mathcal{O}(1)$ |
| (2) | 3 · ADD, CONJ | $4 \cdot \mathcal{O}(1)$ |
| (3) | estimate_PMI($r_{12}$) | $7 \cdot \mathcal{O}(1)$ |
| (4) | SWITCH | $1 \cdot \mathcal{O}(1)$ |
| (5) | CASE | $1 \cdot \mathcal{O}(1)$ |
| (6) | CASE | $1 \cdot \mathcal{O}(1)$ |
| (7) | CASE | $1 \cdot \mathcal{O}(1)$ |
| (8) | CASE | $1 \cdot \mathcal{O}(1)$ |
| (9) | — | — |
| (10) | $\Re\{\cdot\}$, COMP | $2 \cdot \mathcal{O}(1)$ |
| (11) | — | — |
| (12) | — | — |
| (13) | 6 · ADD, 4 · MUL, 2 · CONJ COMP, 2 · $\Re\{\cdot\}$ | $15 \cdot \mathcal{O}(1)$ |
| (14) | — | — |
| (15) | — | — |
| (16) | 2·ADD, 4·MUL, CONJ, $\Re\{\cdot\}$ | $8 \cdot \mathcal{O}(1)$ |
| Σ | | $45 \cdot \mathcal{O}(1)$ |

TABLE 13 complexities for algorithms in Tables 10 and 11

| line | operation(s) | complexity |
|---|---|---|
| (1) | 3 · ADD, CONJ | $4 \cdot \mathcal{O}(1)$ |
| (2) | 3 · ADD, CONJ | $4 \cdot \mathcal{O}(1)$ |
| (3) | $\Re\{\cdot\}$, $\Im\{\cdot\}$, ADD, COMP | $4 \cdot \mathcal{O}(1)$ |
| (4) | — | — |
| (5) | 5 · ADD, 9 · MUL, 2 · CONJ, $\Re\{\cdot\}$ | $17 \cdot \mathcal{O}(1)$ |
| Σ | | $29 \cdot \mathcal{O}(1)$ |

TABLE 14 sub-complexities for complexity reduced algorithm

| subroutine | complexity |
|---|---|
| precomputation | $66 \cdot \mathcal{O}(1)$ |
| algorithm in Table 8 | $45 \cdot \mathcal{O}(1)$ |
| algorithm in Table 9 | $45 \cdot \mathcal{O}(1)$ |
| algorithm in Table 10 | $29 \cdot \mathcal{O}(1)$ |
| algorithm in Table 11 | $29 \cdot \mathcal{O}(1)$ |
| search procedure | $3 \cdot \mathcal{O}(1)$ |
| Σ | $217 \cdot \mathcal{O}(1)$ |

TABLE 15

Squared Euclidean norm of channel matrix multiplied with precoding vectors

| | i | | | | | | | |
|---|---|---|---|---|---|---|---|---|
| | 1 | 2 | 3 | 4 | 5 | 6 | 7 | 8 |
| $\|Hp_i\|^2$ | 6.4306 | 4.6395 | 8.2429 | 3.8138 | 3.0005 | 13.7139 | 3.3343 | 3.0782 |

| | i | | | | | | | |
|---|---|---|---|---|---|---|---|---|
| | 9 | 10 | 11 | 12 | 13 | 14 | 15 | 16 |
| $\|Hp_i\|^2$ | 2.9322 | 9.2539 | 5.5212 | 5.4195 | 2.8599 | 10.4503 | 6.6690 | 3.1476 |

Above, the complexity of determining the precoding vector which maximizes energy given channel matrix H in LTE systems operating in closed-loop has been analyzed. Squared Euclidean norm has been chosen as a proper criterion to determine the precoding vector $p_i$ with index i, given the channel matrix H, assuming transmission on one layer. First, the case of two antenna ports at eNodeB has been assumed. The classic approach performs an exhaustive search, iterating over all possible precoding vectors and reporting the index with corresponding precoding vector maximizing the squared Euclidean norm. In case of two or four transmit antenna ports at eNodeB, four or sixteen possible precoding vectors have to be analyzed. The mathematical procedure for both cases has been described in detail accompanied by examples. Exploiting the mathematical properties of the precoding vectors, it is possible to develop a complexity reduced algorithm for precoding vector selection. In case of two transmit antennas at eNodeB, this algorithm restricts on an analysis of one coefficient $r_{12}$ and determines the index of the target precoding vector by maximizing the squared Euclidean norm as described above. It is no longer necessary to iterate through all possible precoding vector candidates, resulting in a reduction of operations and, thus, saving power at the UE. In case of four antenna ports at eNodeB, the procedure is split up into four sub-routines, which analyze six coefficients $r_{12}$, $r_{13}$, $r_{14}$, $r_{23}$, $r_{24}$, $r_{34}$ and determine the index of the target precoding vector by maximizing the squared Euclidean norm. The developed algorithm for transmission on two antenna ports can be used for transmission on four antenna ports as well. Finally the overall complexities of both approaches have been analyzed. In case of two antenna ports at eNodeB, corresponding to four precoding vectors, the classic approach and the complexity reduced approach have a complexity of $51 \cdot \mathcal{O}(1)$ and $12 \cdot \mathcal{O}(1)$, respectively. The complexity of the novel approach could be reduced for more than four times. In case of four antenna ports at eNodeB, corresponding to sixteen precoding vectors, the classic approach and the complexity reduced approach have a complexity of $639 \cdot \mathcal{O}(1)$ and $217 \cdot \mathcal{O}(1)$, respectively. The complexity of the novel approach could be reduced for approximately three times. Hence, the overall complexity in both cases could be significantly outperformed, leading to reduced power consumption at the UE.

A low complexity PMI selection in LTE Systems with two transmit antenna ports at eNodeB has been provided. Moreover, a low complexity PMI selection in LTE Systems with four transmit antenna ports at eNodeB has been provided.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

The inventive decomposed signal can be stored on a digital storage medium or can be transmitted on a transmission medium such as a wireless transmission medium or a wired transmission medium such as the Internet.

Depending on certain implementation requirements, embodiments of the invention can be implemented in hardware or in software. The implementation can be performed using a digital storage medium, for example a floppy disk, a DVD, a CD, a ROM, a PROM, an EPROM, an EEPROM or a FLASH memory, having electronically readable control signals stored thereon, which cooperate (or are capable of cooperating) with a programmable computer system such that the respective method is performed.

Some embodiments according to the invention comprise a non-transitory data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processor, for example a computer, or a programmable logic device, configured to or adapted to perform one of the methods described herein.

A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are advantageously performed by any hardware apparatus.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. An apparatus for determining a target precoding matrix from a plurality of precoding matrix candidates, the precoding matrix candidates being adapted to be applied on a data stream, wherein the data stream is to be transmitted by a transmitter, and wherein the apparatus comprises:

a covariance matrix value provider for providing one or more complex covariance matrix values, wherein the one or more complex covariance matrix values are complex numbers, wherein each one of the one or more complex covariance matrix values is an off-diagonal coefficient of a multiple input multiple output channel covariance matrix or a combination of two or more off-diagonal coefficients of the multiple input multiple output channel covariance matrix, a real part determiner being configured to determine a real part of at least one of the one or more complex covariance matrix values or to determine a real part of a combination of at least one of the one or more complex covariance matrix values and at least one component of the precoding matrix candidates to obtain one or more real covariance values, wherein the one or more real covariance values are real numbers, and a precoding matrix determiner for determining the target precoding matrix from the plurality of precoding matrix candidates, wherein the precoding matrix determiner is configured to determine the target precoding matrix based on at least one of the one or more real covariance values.

2. An apparatus according to claim 1,
wherein the apparatus is configured to determine a target precoding vector as the target precoding matrix from a plurality of precoding vector candidates,
wherein the plurality of precoding vector candidates is the plurality of precoding matrix candidates,
wherein each one of the precoding vector candidates is a matrix having one or more rows and exactly one column or a matrix having exactly one row and one or more columns, and
wherein the precoding matrix determiner is adapted to determine the target precoding vector as the target precoding matrix from the plurality of precoding vector candidates.

3. An apparatus according to claim 1, wherein, the precoding matrix determiner is adapted to determine the target precoding matrix from the plurality of precoding matrix candidates by comparing a first absolute value of one of the one or more real covariance values and a second absolute value of an imaginary number of one of the one or more complex covariance matrix values.

4. An apparatus according to claim 1,
wherein the channel covariance matrix is a Multi Input Multi Output channel covariance matrix having at least two rows and at least two columns, and
wherein the covariance matrix value provider is adapted to provide the one or more complex covariance matrix values such that each one of the one or more complex covariance matrix values is an off-diagonal coefficient of the Multi Input Multi Output channel covariance matrix or a combination of two or more off-diagonal coefficients of the Multi Input Multi Output channel covariance matrix.

5. An apparatus according to claim 1, wherein the covariance matrix value provider is configured to provide the one or more complex covariance matrix values without determining any main-diagonal coefficient of the channel covariance matrix.

6. An apparatus according to claim 2,
wherein the covariance matrix value provider is configured to provide one or more off-diagonal coefficients of the channel covariance matrix,
wherein each one of the one or more off-diagonal coefficients of the channel covariance matrix is a coefficient of a product of a group of one or more matrix products or a sum of coefficients of products of the group of one or more matrix products,
wherein each product of the group of one or more matrix products is a product of a channel matrix and a conjugate transpose matrix of said channel matrix, wherein each coefficient of said channel matrix indicates a channel between a transmit antenna of the transmitter and a receive antenna of a receiver.

7. An apparatus according to claim 2,
wherein the channel covariance matrix is defined by the formula:

$$R = \sum_{j=0}^{M-1} H_j^H H_j$$

wherein M indicates a number of subcarriers of a group of subcarriers, wherein j indicates a subcarrier of the group of subcarriers, wherein $H_j$ indicates a channel matrix of a group of channel matrices, and wherein $H_j^H$ indicates a conjugate transpose matrix of said channel matrix.

8. An apparatus according to claim 2,
wherein the channel covariance matrix has exactly two rows and exactly two columns, wherein the channel covariance matrix is defined by the formula:

$$R = \begin{pmatrix} r_{11} & r_{12} \\ r_{21} & r_{22} \end{pmatrix}$$

$$= \sum_{j=0}^{M-1} \begin{pmatrix} h_{11} & h_{12} \\ h_{21} & h_{22} \end{pmatrix}_j^H \begin{pmatrix} h_{11} & h_{12} \\ h_{21} & h_{22} \end{pmatrix}_j$$

$$= \sum_{j=0}^{M-1} \begin{pmatrix} |h_{11}|^2 + |h_{21}|^2 & h_{11}^* h_{12} + h_{21}^* h_{22} \\ h_{11} h_{12}^* + h_{21} h_{22}^* & |h_{12}|^2 + |h_{22}|^2 \end{pmatrix}_j$$

wherein $$\begin{pmatrix} r_{11} & r_{12} \\ r_{21} & r_{22} \end{pmatrix}$$

indicates the channel covariance matrix, wherein $$\begin{pmatrix} h_{11} & h_{12} \\ h_{21} & h_{22} \end{pmatrix}_j$$

indicates a channel matrix of a group of channel matrices, wherein $$\begin{pmatrix} h_{11} & h_{12} \\ h_{21} & h_{22} \end{pmatrix}_j^H$$

indicates the conjugate transpose matrix of said channel matrix,
wherein $r_{11}$ a first main-diagonal covariance coefficient, $r_{12}$ indicates a first off-diagonal covariance coefficient, $r_{21}$ indicates a second off-diagonal covariance coefficient and $r_{22}$ indicates a second covariance main-diagonal coefficient of the channel covariance matrix,
wherein $h_{11}$, $h_{21}$, $h_{12}$ and $h_{22}$ indicate coefficients of said channel matrix,
wherein $h^*_{11}$ indicates a conjugate value of the coefficient $h_{11}$, wherein $h^*_{21}$ indicates a conjugate value of the coefficient $h_{21}$, wherein $h^*_{12}$ indicates a conjugate value of the coefficient $h_{12}$, wherein $h^*_{22}$ indicates a conjugate value of the coefficient $h_{22}$, and
wherein the covariance matrix value provider is configured to determine the first off-diagonal covariance coefficient $r_{12}$ or the second off-diagonal covariance coefficient $r_{21}$ to determine the target precoding vector.

9. An apparatus according to claim 8,
wherein the covariance matrix value provider is configured to provide the coefficient $r_{12}$ or the coefficient $r_{21}$ as the exactly one off-diagonal coefficient of the channel covariance matrix,
wherein the first off-diagonal covariance coefficient $r_{12}$ is defined by $h^*_{11}h_{12}+h^*_{21}h_{22}$
wherein the second off-diagonal covariance coefficient $r_{21}$ is defined by $h_{11}h^*_{12}+h_{21}h^*_{22}$
wherein the real part determiner is adapted to determine a real part of the first off-diagonal covariance coefficient $r_{12}$ or a real part of the second off-diagonal covariance coefficient $r_{21}$.

10. An apparatus according to claim 8,
wherein the precoding matrix determiner is furthermore configured to determine an imaginary part of the first off-diagonal covariance coefficient $r_{12}$ or of the second off-diagonal covariance coefficient $r_{21}$, to obtain an imaginary covariance value, and
wherein the precoding matrix determiner is configured to determine the target precoding vector based on one of the one or more real covariance values and the imaginary covariance value.

11. An apparatus according to claim 10,
wherein the precoding matrix determiner is configured to determine the target precoding vector by determining a first absolute value of said one of the one or more real covariance values, by determining a second absolute value of the imaginary covariance value and by comparing the first and the second absolute value.

12. An apparatus according to claim 2,
wherein the apparatus is adapted to determine the target precoding vector from the plurality of precoding vector candidates, the plurality of precoding vector candidates comprising a first precoding vector $p_1$, a second precoding vector $p_2$, a third precoding vector $p_3$ and a fourth precoding vector $p_4$,
wherein the first precoding vector $p_1$, the second precoding vector $p_2$, the third precoding vector $p_3$ and the fourth precoding vector $p_4$ are defined by $$p_1 = \frac{1}{\sqrt{2}}\begin{pmatrix}1\\1\end{pmatrix}$$

$$p_2 = \frac{1}{\sqrt{2}}\begin{pmatrix}1\\-1\end{pmatrix}$$

$$p_3 = \frac{1}{\sqrt{2}}\begin{pmatrix}1\\j\end{pmatrix}$$

$$p_4 = \frac{1}{\sqrt{2}}\begin{pmatrix}1\\-j\end{pmatrix}.$$

13. An apparatus according to claim 2,
wherein the covariance matrix value provider is configured to determine more than one off-diagonal coefficient of the channel covariance matrix, wherein the channel covariance matrix has exactly four rows and exactly four columns, wherein the channel covariance matrix is defined by the formula:

$$R = \begin{pmatrix} r_{11} & r_{12} & r_{13} & r_{14} \\ r_{21} & r_{22} & r_{23} & r_{24} \\ r_{31} & r_{32} & r_{33} & r_{34} \\ r_{41} & r_{42} & r_{43} & r_{44} \end{pmatrix}$$

$$= \sum_{j=0}^{M-1} \begin{pmatrix} h_{11} & \cdots & h_{14} \\ \vdots & \ddots & \vdots \\ h_{N_R 1} & \cdots & h_{N_R 4} \end{pmatrix}_j^H \begin{pmatrix} h_{11} & \cdots & h_{14} \\ \vdots & \ddots & \vdots \\ h_{N_R 1} & \cdots & h_{N_R 4} \end{pmatrix}_j$$

wherein $$\begin{pmatrix} r_{11} & r_{12} & r_{13} & r_{14} \\ r_{21} & r_{22} & r_{23} & r_{24} \\ r_{31} & r_{32} & r_{33} & r_{34} \\ r_{41} & r_{42} & r_{43} & r_{44} \end{pmatrix}$$

indicates the channel covariance matrix,
wherein $$\begin{pmatrix} h_{11} & \cdots & h_{14} \\ \vdots & \ddots & \vdots \\ h_{N_R 1} & \cdots & h_{N_R 4} \end{pmatrix}_j$$

indicates a channel matrix of a group of one or more channel matrices,
wherein $$\begin{pmatrix} h_{11} & \cdots & h_{14} \\ \vdots & \ddots & \vdots \\ h_{N_R 1} & \cdots & h_{N_R 4} \end{pmatrix}_j^H$$

indicates the conjugate transpose matrix of said channel matrix of the group of one or more channel matrices,
wherein $r_{11}, r_{12}, r_{13}, r_{14}, r_{21}, r_{22}, r_{23}, r_{24}, r_{31}, r_{32}, r_{33}, r_{34}, r_{41}, r_{42}, r_{43}, r_{44}$ indicate coefficients of the channel covariance matrix,
wherein $h_{11}, h_{14}, h_{N_R 1}, h_{N_R 4}$ indicate coefficients of said channel matrix, and
wherein $N_R$ indicates the number of rows of said channel matrix.

14. An apparatus according to claim 2,
wherein the covariance matrix value provider is configured to determine at least three off-diagonal coefficients of the channel covariance matrix as at least three determined coefficients and at least one conjugate value of a further off-diagonal coefficient of the channel covariance matrix as at least one determined conjugate value, and
wherein the covariance matrix value provider is configured to provide the one or more complex covariance matrix values such that each of the one or more complex covariance matrix values is a combination of at least two values of the at least three determined coefficients and the at least one determined conjugate value.

15. An apparatus according to claim 13,
wherein the covariance matrix value provider is configured to determine the off-diagonal coefficients $r_{12}, r_{14}$ and $r_{34}$ of the channel covariance matrix,
wherein the covariance matrix value provider is configured to determine a conjugate value $r^*_{23}$ of the off-diagonal coefficient $r_{23}$ of the channel covariance matrix, and wherein the covariance matrix value provider is configured to provide the sum $r_{12}+r_{14}+r^*_{23}+r_{34}$ to determine the target precoding vector.

16. An apparatus according to claim 13,
wherein the apparatus is configured to determine the target precoding vector from the at least 16 precoding vector candidates,
wherein the covariance matrix value provider is configured to form at least two precoding vector groups, and wherein the covariance matrix value provider is configured to assign each of the 16 precoding vector candidates to exactly one of the precoding vector groups,
wherein the precoding matrix determiner is configured to determine a target group vector for each of the precoding vector groups, and
wherein the precoding matrix determiner is configured to determine one of the target group vectors as the target precoding vector.

17. A mobile communication device comprising:
a baseband processor;
an apparatus for determining a target precoding matrix from a plurality of precoding matrix candidates, the precoding matrix candidates being adapted to be applied on a data stream, wherein the data stream is to be transmitted by a transmitter, and wherein the apparatus for determining the target precoding matrix comprises:
a covariance matrix value provider for providing one or more complex covariance matrix values, wherein the one or more complex covariance matrix values are complex numbers, wherein each one of the one or more complex covariance matrix values is an off-diagonal coefficient of a multiple input multiple output channel covariance matrix or a combination of two or more off-diagonal coefficients of the multiple input multiple output channel covariance matrix,
a real part determiner being configured to determine a real part of at least one of the one or more complex covariance matrix values or to determine a real part of a combination of at least one of the one or more complex covariance matrix values and at least one component of the precoding matrix candidates to obtain one or more real covariance values, wherein the one or more real covariance values are real numbers, and
a precoding matrix determiner for determining the target precoding matrix from the plurality of precoding matrix candidates, wherein the precoding matrix determiner is configured to determine the target precoding matrix based on at least one of the one or more real covariance values.

18. A mobile communication device according to claim 17,
wherein the apparatus is configured to determine a target precoding vector as the target precoding matrix from a plurality of precoding vector candidates,
wherein the plurality of precoding vector candidates is the plurality of precoding matrix candidates,
wherein each one of the precoding vector candidates is a matrix having one or more rows and exactly one column or a matrix having exactly one row and one or more columns, and
wherein the precoding matrix determiner is adapted to determine the target precoding vector as the target precoding matrix from the plurality of precoding vector candidates.

19. A method for determining a target precoding matrix from a plurality of precoding matrix candidates, the precoding matrix candidates being adapted to be applied on a data stream, wherein the data stream is to be transmitted by a transmitter, and wherein the method comprises:
providing one or more complex covariance matrix values to a programmable computer system, wherein the one or more complex covariance matrix values are complex numbers, wherein each one of the one or more complex covariance matrix values is an off-diagonal coefficient of a multiple input multiple output channel covariance matrix or a combination of two or more off-diagonal coefficients of the multiple input multiple output channel covariance matrix,
determining, using the programmable computer system, a real part of at least one of the one or more complex covariance matrix values or determining a real part of a combination of at least one of the one or more complex covariance matrix values and at least one component of the precoding matrix candidates to obtain one or more real covariance values, wherein the one or more real covariance values are real numbers, and
determining, using the programmable computer system, the target precoding matrix from the plurality of precoding matrix candidates by comparing one of the one or more real covariance values and at least one other value.

* * * * *